United States Patent
Wang et al.

(10) Patent No.: US 10,345,475 B2
(45) Date of Patent: Jul. 9, 2019

(54) EXTENDED 1D INVERSION OF ELECTROMAGNETIC MEASUREMENTS FOR FORMATION EVALUATION

(71) Applicant: Schlumberger Technology Corporation, Sugar Land, TX (US)

(72) Inventors: Gong Li Wang, Sugar Land, TX (US); Thomas D. Barber, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 464 days.

(21) Appl. No.: 14/782,149

(22) PCT Filed: Apr. 2, 2014

(86) PCT No.: PCT/US2014/032651
§ 371 (c)(1),
(2) Date: Oct. 2, 2015

(87) PCT Pub. No.: WO2014/165577
PCT Pub. Date: Oct. 9, 2014

(65) Prior Publication Data
US 2016/0047934 A1 Feb. 18, 2016

Related U.S. Application Data

(60) Provisional application No. 61/973,761, filed on Apr. 1, 2014, provisional application No. 61/807,709, filed on Apr. 2, 2013.

(51) Int. Cl.
*G01V 3/10* (2006.01)
*G01V 3/18* (2006.01)
(Continued)

(52) U.S. Cl.
CPC .............. *G01V 3/28* (2013.01); *G01V 3/10* (2013.01); *G01V 3/104* (2013.01); *G01V 3/18* (2013.01); *G01V 3/38* (2013.01)

(58) Field of Classification Search
CPC . G01V 3/28; G01V 3/10; G01V 3/104; G01V 3/38; G01V 3/18
(Continued)

(56) References Cited

U.S. PATENT DOCUMENTS

| 3,014,177 A | 12/1961 | Hungerford et al. |
|---|---|---|
| 6,574,562 B2 | 6/2003 | Tabarovsky et al. |

(Continued)

FOREIGN PATENT DOCUMENTS

| EP | 2320251 A2 | 5/2011 |
|---|---|---|
| WO | 2008137987 A1 | 11/2008 |

(Continued)

OTHER PUBLICATIONS

International Search Report for International Application No. PCT/US2014/032651 dated Aug. 4, 2014.
(Continued)

*Primary Examiner* — Stephanie E Bloss
(74) *Attorney, Agent, or Firm* — Michael Dae

(57) ABSTRACT

A method to determine at least one formation property of a subterranean formation includes providing a downhole electromagnetic logging tool having at least one transmitter array and one receiver array to acquire measurements in the formation. The method further includes performing a first inversion in response to the measurements, assuming dip or dip azimuth is constant in an inversion zone within the formation to obtain an inverted formation model. The method includes determining an n-th order partial derivative matrix of at least one of dip or dip azimuth, wherein n is greater than or equal to 1. The method includes performing
(Continued)

a second inversion using the determined n-th order partial derivative matrix, wherein at least one of dip and dip azimuth are allowed to vary in the inversion zone, to obtain an updated formation model. The method includes determining the formation property using the updated formation model.

21 Claims, 13 Drawing Sheets

(51) Int. Cl.
  *G01V 3/28* (2006.01)
  *G01V 3/38* (2006.01)
(58) Field of Classification Search
  USPC .......................................................... 702/7
  See application file for complete search history.

(56) References Cited

U.S. PATENT DOCUMENTS

| | | | |
|---|---|---|---|
| 6,643,589 B2 | 11/2003 | Zhang et al. | |
| 6,760,666 B2 | 7/2004 | Hagiwara | |
| 7,277,796 B2* | 10/2007 | Kuchuk | E21B 49/00 702/13 |
| 7,317,991 B2 | 1/2008 | Wang et al. | |
| 7,392,137 B2 | 6/2008 | Tabarovsky et al. | |
| 8,473,264 B2* | 6/2013 | Barnes | G01V 7/16 702/14 |
| 2002/0173914 A1 | 11/2002 | Zhang et al. | |
| 2005/0049792 A1 | 3/2005 | Yu et al. | |
| 2005/0083063 A1 | 4/2005 | Omeragic et al. | |
| 2005/0140373 A1 | 6/2005 | Li et al. | |
| 2005/0256645 A1* | 11/2005 | Rabinovich | G01V 3/28 702/7 |
| 2007/0061080 A1* | 3/2007 | Zhdanov | G01V 3/12 702/7 |
| 2008/0071709 A1* | 3/2008 | Strack | G01V 3/083 706/20 |
| 2008/0120035 A1* | 5/2008 | Hassan | G01B 21/22 702/10 |
| 2008/0133139 A1 | 6/2008 | Frenkel | |
| 2008/0211507 A1* | 9/2008 | Zhdanov | G01V 3/28 324/333 |
| 2008/0270032 A1* | 10/2008 | Nikitenko | G01V 3/28 702/6 |
| 2010/0185393 A1* | 7/2010 | Liang | G01V 3/28 702/7 |
| 2010/0198569 A1* | 8/2010 | Wu | G01V 3/38 703/6 |
| 2010/0230095 A1 | 9/2010 | Yin | |
| 2012/0265442 A1* | 10/2012 | Zhao | G01V 3/20 702/7 |
| 2013/0080058 A1* | 3/2013 | Wu | G01V 1/42 702/7 |

FOREIGN PATENT DOCUMENTS

| | | |
|---|---|---|
| WO | 2011091216 A2 | 7/2011 |
| WO | 2011123379 A1 | 10/2011 |
| WO | 2011130587 A2 | 10/2011 |
| WO | 2013036896 A1 | 3/2013 |
| WO | 2014165577 A1 | 10/2014 |

OTHER PUBLICATIONS

Abubakar, A., et al, 2004, A three-dimensional parametric inversion of multi-component multi-spacing induction logging data, Presented at SEG Int'l Exposition and Annual Meeting, Denver, Colorado, Oct. 10-15, (4 pages).
Abubakar, A., Habashy, T. M., 2006, Three-dimensional single-well imaging of the multi-array triaxial induction logging data, SEG/ New Orleans (5 pages).
Alumbaugh, D. L. and Wilt, M., 2001, A numerical sensitivity study of three dimensional imaging from a single borehole, Petrophysics, vol. 42, No. 1, pp. 19-31.
Anderson, B. I., Barber, T. D., and Habashy, T. M., 2002, The interpretation and inversion of fully triaxial induction data; A sensitivity Study, SPWLA 43th Annual Logging Symposium, Jun. 2-5, 2002 Paper O. (14 pages).
Barber et al., "Determining Formation Resistivity in the Presence of Invasion," SPE 90526, presented at the SPE Annual Technical Conference and Exhibition, Houston, Texas, Sep. 26-29, 2004 (25 pages).
Cheryauka, A. B. and Zhdanov, M. S., 2001, Focusing inversion of tensor induction logging data in anisotropic formations and deviated well, Presented at SEG Int'l Exposition and Annual Meeting, San Antonio, Texas, Sep. 9-14, 2001 (4 pages).
Gribenko, A., and Zhdanov, M. S., 2004, Fast 3-D imaging from a deviated borehole using tensor induction logging data with LWD applications, Presented at SEG Int'l Exposition and Annual Meeting, Denver, Colorado, Oct. 10-15, 2004, (4 pages).
Gribenko, A., and Zhdanov, M. S., 2007, Regularized integral equation based inversion of tensor induction logging data in three-dimensional formations, Presented at SEG Int'l Exposition and Annual Meeting, San Antonio, Texas, Sep. 23-25, 2007 (5 pages).
Gribenko, A., and Zhdanov, M. S., 2009, Rigorous 3D inversion of tensor electrical and magnetic induction well logging data in inhomogeneous media, Presented at SEG Int'l Exposition and Annual Meeting, Houston, Texas, Oct. 25-30, 2009 (5 pages).
Habashy et al., "A General Framework for Constraint Minimization for the Inversion of Electromagnetic Measurements," Progress in Electromagnetic Research, vol. 46, pp. 265-312 (2004).
Hagiwara, T., 2010, Apparent dip and apparent anisotropy from frequency-focused triaxial induction log, Transactions of the SPWLA 51th Annual Logging Symposium, Paper G, Jun. 19-23, 2010 (11 pages).
Hou et al., "Real-time Borehole Correction for a New Multicomponent Array Induction Logging Tool in OBM Wells," Transactions of the SWPLA 42th Annual Logging Symposium, Jun. 16-20, 2012 (16 pages).
Kriegshäuser et al., "A New Multicomponent Induction Logging Tool to Resolve Anisotropic Formations," Transactions of the SPWLA 41st Annual Logging Symposium, Paper D, Jun. 4-7, 2000 (14 pages).
Lu, X., and Alumbaugh, D. L., 2001, One-dimensional inversion of three-component induction logging in anisotropic media, Presented at SEG Int'l Exposition and Annual Meeting. San Antonio, Texas, Sep. 9-14, 2001 (4 pages).
Rosthal et al., "Field Test Results of an Experimental Fully-Triaxial Induction Tool," Transactions of the SPWLA 44th Annual Logging Symposium, Paper QQ Jun. 22-25, 2003 (14 pages).
Sun, K. et al, 2010, Evaluation of resistivity anisotropy and formation dip from directional electromagnetic tools while drilling, Transactions of the SPWLA 51th Annual Logging Symposium, Paper I, Jun. 19-23, 2010 (16 pages).
Tompkins, M. J., and Alumbaugh, D. L., 2002, A transversely isotropic 1-D electromagnetic inversion scheme requiring minimal a priori information, , Presented at SEG Int'l Exposition and Annual Meeting, Salt Lake City, Utah, Oct. 6-11, 2002 (4 pages).
Wang, H. et al., 2003, Fast and rigorous inversion of triaxial induction logging data to determine formation resistivity anisotropy, bed boundary position, relative dip and azimuth angles. Society of Exploration Geophysicists Expanded Abstracts 22, 514. (4 pages).
Wang et al., "Triaxial Induction Logging: Theory, Modeling, Inversion, and Interpretation," SPE 103897, SPE International Oil & Gas Conference and Exhibition, Beijing, China, Dec. 5-7, 2006 (19 pages).
Wang, H. et al., 2006b, Determining anisotropic formation resistivity at any relative dip using a multiarray triaxial Induction tool, paper SPE 103113 presented at the SPE Annual Technical Conference and Exhibition, San Antonio, Texas, USA., Sep. 24-27, 2006 (13 pages).

(56) References Cited

OTHER PUBLICATIONS

Wang, H. et al., 2008, Sensitivity study and inversion of the fully-triaxial induction logging in cross-bedded anisotropic formation, Presented at SEG Int'l Exposition and Annual Meeting, Las Vegas, Nevada, USA, Nov. 9-14, 2008, (5 pages).
Wang et al., "Triaxial Induction Applications in Difficult and Unconventional Formations," Transactions of the 53rd SPWLA Annual Logging Symposium, Paper G, Jun. 16-20, 2012 (14 pages).
Wu, P. et al., 2007, Borehole effects and correction in OBM with dip and anisotropy for triaxial induction tools, paper SPE 110623 presented at the SPE Annual Technical Conference and Exhibition, Anaheim, California, USA, Nov. 11-14, 2007 (20 pages).
Wu et. al., "Determining Formation Dip From a Fully Triaxial Induction Tool," presented at SPWLA 51st Annual Logging Symposium, Perth Australia, Jun. 19-23, 2010 (16 pages).
Wu et al., "Efficient Hierarchical Processing and Interpretation of Triaxial Induction Data in Formations With Changing Dip," SPE 135442, presented at SPE Annual Technical Conference and Exhibition, Florence Italy, Sep. 19-22, 2010 (14 pages).
Yu, L. et al., 2001, A fast inversion method for multicomponent induction log data, Presented at SEG Int'l Exposition and Annual Meeting. San Antonio, Texas, Sep. 9-14, 2001 (4 pages).

Zhang, Z. J., Yuan, N., and Liu, R., 2012, 1-D inversion of triaxial induction logging in layered anisotropic formation, Progress in Electromagnetics Research B, vol. 44, pp. 383-403.
Zhang, Z., 2001, Recovering absolute formation dip and 1D anisotropic resistivity structure from inversion of multicomponent induction logging data, Presented at SEG Int'l Exposition and Annual Meeting. San Antonio, Texas, Sep. 9-14, 2001 (4 pages).
Zhang, Z., Yu, L, Kriegshäuser, B., and Chunduru, R., 2001, Simultaneous determination of relative angles and anisotropic resistivity using multicomponent induction logging data, Transactions of the SPWLA 42th Annual Logging Symposium, Paper Q, Jun. 17-20, 2001 (11 pages).
Zhdanov, M. S., Cheryauka, A. B., and Peksen, E., 2003, Sharp boundary inversion of tensor induction logging data, Transactions of the SPWLA 44th Annual Logging Symposium, Paper PP, Jue 22-25, 2003 (13 pages).
Zhdanov, M. S., Tartaras, E, and Gribenko, A., Fast 3D imaging from a single borehole using tensor induction logging data, Petrophysics, vol. 45, No. 2, pp. 167-178.
International Preliminary report on patentability issued in the related PCT application PCT/US2014/032651 dated Oct. 6, 2015 (7 pages).
Office Action issued in the related MX application MX/a/2015/013879, dated Aug. 17, 2016 (5 pages).

* cited by examiner

EXTENDED 1D INVERSION OF ELECTROMAGNETIC MEASUREMENTS FOR FORMATION EVALUATION

BACKGROUND

Technical Field

The present disclosure relates generally to the field of electromagnetic well logging techniques. More specifically, the present disclosure relates to providing improved inversion techniques for determining characteristics of a subsurface formation based on electromagnetic measurements obtained using a well logging tool disposed in a borehole.

Background Information

This section is intended to introduce the reader to various aspects of art that may be related to various aspects of the subject matter described and/or claimed below. This discussion is believed to be helpful in providing the reader with background information to facilitate a better understanding of the various aspects of the present disclosure. Accordingly, it should be understood that these statements are to be read in this light, not as admissions of prior art.

Logging tools have long been used in wellbores to make, for example, formation evaluation measurements to infer properties of the formations surrounding the borehole and the fluids in the formations. As examples only, common logging tools include electromagnetic tools, nuclear tools, and nuclear magnetic resonance (NMR) tools. Electromagnetic logging tools typically measure the resistivity (or its reciprocal, conductivity) of a formation. For instance, such electromagnetic resistivity tools include galvanic tools, induction tools, and propagation tools. Typically, a measurement of the attenuation and phase shift of an electromagnetic signal that has passed through the formation is used to determine the resistivity and/or other characteristics of the formation.

The concept of multiaxial (e.g., triaxial) electromagnetic measurements can be traced back to the 1960s, with the concept having been described in U.S. Pat. No. 3,014,177 to Hungerford. Since then, various triaxial electromagnetic tools have been introduced. See, e.g., Kriegshäuser et al., "*A New Multicomponent Induction Logging Tool to Resolve Anisotropic Formations*," Transactions of the SPWLA 41st Annual Logging Symposium, Paper D (2000). For instance, triaxial electromagnetic tools may include a multiarray electromagnetic induction tool having collocated transmitter and/or receiver coils, such as of a type described generally in Barber et al., "*Determining Formation Resistivity In The Presence of Invasion*," SPE 90526, presented at the SPE Annual Technical Conference and Exhibition, Houston, Tex., Sep. 26-29, 2004, or in Rosthal et al., "*Field Test Results of an Experimental Fully-Triaxial Induction Tool*," Transactions of the SPWLA 44th Annual Logging Symposium, Paper QQ (2003). Additional multi-array triaxial induction tools continue to be developed. See, e.g., Hou et al., WO Patent Publication No. WO2011/123379A1; see also Hou et al., "*Real-time Borehole Correction For a New Multicomponent Array Induction Logging Tool in OBM Wells*," Transactions of the SWPLA 42th Annual Logging Symposium, Paper PPP (2012).

When compared to certain older conventional tools, some of the more recent electromagnetic tools include those that incorporate mutually orthogonal coils and/or tilted coils to the tool design, which can serve as a transmitter, a receiver, or both (e.g., a transceiver). The incorporation of such coils with off-borehole axis orientation enables measuring a full, a nearly full, or a partially full tensor measurement instead of, for example, just a zz-component, as would be the case in some conventional tools with off-borehole axis coil arrangements. Such an expanded set of measurements may allow for extraction of resistivity anisotropy and geometry of subsurface formations. For example, multiaxial electromagnetic logging instruments can also be used to determine the relative dip angle ($\theta$) and dip azimuth angle ($\Phi$) of rock formations as well as anisotropic formation resistivities, including vertical resistivity (Rv) and horizontal resistivity (Rh). The apparent conductivity tensor measured by triaxial electromagnetic tools is sensitive to these formation parameters.

Several methods are known for solving for such formation parameters, each having certain advantages and disadvantages. For instance, one category of these methods is based on a formation model where bed boundaries are neglected, and a uniform anisotropic formation model is assumed. This is sometimes referred to as a 0D (zero-D) inversion or a 0D formation model. Example implementations of 0D models are described in more detail in commonly owned International Patent Application Publication No. WO2011/091216, which is hereby incorporated by reference in its entirety. Some advantages of 0D inversions are that they are computationally fast and thus are often suitable for use as a real-time answer product for generating coarse estimates of formation properties, and that they generally provide high-resolution dip estimation. 0D inversions can provide good results when used in formations with weak resistivity contrast and/or a slow varying resistivity. However, when the resistivity contrast in a given formation is large, 0D inversion algorithms may be negatively impacted by shoulder bed effects (e.g., bed boundary effects), as 0D formations models can be considered "simplified" in the sense that they do not include bed boundaries in the formation model. This can result in inaccuracies and adverse effects on both resistivity and dip estimations.

To overcome the shoulder bed effect, bed boundaries may be incorporated in the formation model. The simplest formation model that accounts for shoulder bed effects is a 1D formation model (e.g., based on vertical 1D algorithm). The basic assumption of a 1D formation model is that dip and azimuth are constant across the whole model, although resistivity (Rh and Rv) may vary from bed to bed. In other words, for a 1D model, each bed is assigned a different anisotropy characterized by horizontal resistivity (Rh) and vertical resistivity (Rv), with all the bed boundaries are assumed to be parallel to each other. The normal to the bedding plane is allowed to be tilted relative to the borehole axis. Accordingly, the resultant orientation is characterized by formation dip and dip azimuth.

These parameters can be recovered with a 1D inversion for petrophysical and geological applications. When applied to actual data, the corresponding depth zone is segmented first into a number of small subzones for the ease of 1D inversion implementation. 1D inversion is run over all subzones sequentially first, and the inversion results from all subzones are then combined as the final results for the whole depth zone. Each of these subzones is referred to as an inversion zone, or an inversion window. For example, an inversion zone with a length of up to 100 ft has been reported to be used for some 1D inversion methods. It is also noted that 1D inversions are also relatively fast from a computational standpoint and thus can be used for real-time or near/substantially real-time applications (providing of results without an appreciable delay). Thus, from an industry perspective, 1D inversion techniques are generally considered as a suitable tradeoff between the model fitness (e.g., compared to 0D inversion techniques) and computational cost. Examples of 1D inversion techniques are described in Wang et al., "*Triaxial Induction Logging: Theory, Modeling, Inversion, and Interpretation*," SPE 103897, SPE International Oil & Gas Conference and Exhibition, Dec. 5-7, 2006.

However, as the use of triaxial electromagnetic logging has increased in popularity, field data sets have shown that formations are often not 1D in the real world. Rather, variations in dip and azimuth are often observed over the length of a given inversion zone. Such variations violate the assumptions of a 1D formation model, and thus indicate that in principle, 1D formation models may not be the best choice for modeling these so-called complex formations. Further, in extreme cases, variation of dip and dip azimuth in the formation may lead to large model errors in the data, which may translate to large errors in resistivity calculations and dip estimates obtained using 1D inversions.

One way of overcoming the drawbacks of 1D inversions in complex formations is to use even higher-dimension inversions, such as 3D inversions which are capable of modeling earth formations even more accurately. As will be appreciated, 3D inversions have been applied in processing cross-well electromagnetic measurements and for controlled source electromagnetic measurements in marine environments. In theory, higher-dimension inversions, such as a 3D inversion, often provide more accurate data by reducing or eliminating model errors. However, from a practical standpoint, such methods are generally time-consuming and require vast computing resources and processing capabilities which generally render them unsuitable for providing real-time or near real-time data and answer products. Furthermore, the inevitable increase in the number of unknowns makes the inversion overall more difficult due to non-uniqueness issues (e.g., can result in multiple models that fit the data).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one illustrative embodiment, a method to determine at least one formation property of a subterranean formation includes providing a downhole electromagnetic logging tool having at least one transmitter array and one receiver array and acquiring measurements in the formation using the transmitter and receiver arrays of the downhole electromagnetic logging tool. The method further includes performing a first inversion in response to the measurements, wherein at least one of dip or dip azimuth are assumed constant in an inversion zone within the formation to obtain an inverted formation model that comprises at least one of horizontal resistivity (Rh), vertical resistivity (Rv), dip, and dip azimuth. The method further includes determining an n-th order partial derivative matrix of at least one of dip or dip azimuth, wherein n is greater than or equal to 1. The method further includes performing a second inversion using the determined n-th order partial derivative matrix, wherein at least one of dip and dip azimuth are allowed to vary in the inversion zone, to obtain an updated formation model. Additionally, the method includes determining the at least one formation property of the formation using the updated formation model.

In a further illustrative embodiment, a system includes an electromagnetic logging tool having at least one transmitter array and one receiver array, the electromagnetic logging tool being configured to acquire measurements in a subterranean formation using the transmitter and receiver arrays when disposed in the formation. The system also includes a processing device that performs a first inversion in response to the measurements wherein at least one of dip or dip azimuth are assumed constant in an inversion zone within the formation to obtain an inverted formation model that comprises at least one of horizontal resistivity (Rh), vertical resistivity (Rv), dip, and dip azimuth, determines an n-th order partial derivative matrix of at least one of dip or dip azimuth, wherein n is greater than or equal to 1, performs a second inversion using the determined n-th order partial derivative matrix, wherein at least one of dip and dip azimuth are allowed to vary in the inversion zone, to obtain an updated formation model, and determines at least one formation property of the formation using the updated formation model.

In yet another illustrative embodiment, a non-transitory computer-readable medium having computer executable instructions for causing a computer to, in response to electromagnetic measurement obtained by an electromagnetic logging tool disposed in a formation, perform a first inversion wherein at least one of dip or dip azimuth are assumed constant in an inversion zone within the formation to obtain an inverted formation model that comprises at least one of horizontal resistivity (Rh), vertical resistivity (Rv), dip, and dip azimuth, determine an n-th order partial derivative matrix of at least one of dip or dip azimuth, wherein n is greater than or equal to 1, perform a second inversion using the determined n-th order partial derivative matrix, wherein at least one of dip and dip azimuth are allowed to vary in the inversion zone, to obtain an updated formation model, and determine at least one formation property of the formation using the updated formation model.

Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments of the present disclosure are described below. These embodiments are only examples of the presently disclosed techniques. Additionally, in an effort to provide a concise description of these embodiments, all features of an actual implementation may not be described in the specification. It should be appreciated that in the development of any such implementation, as in any engineering or design project, numerous implementation-specific decisions are made to achieve the developers' specific goals, such as compliance with system-related and business-related constraints, which may vary from one implementation to another. Moreover, it should be appreciated that such development efforts might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. The embodiments discussed below are intended to be examples that are illustrative in nature and should not be construed to mean that the specific embodiments described herein are necessarily preferential in nature. Additionally, it should be understood that references to "one embodiment" or "an embodiment" within the present disclosure are not to be interpreted as excluding the existence of additional embodiments that also incorporate the recited features.

Figure 1A:
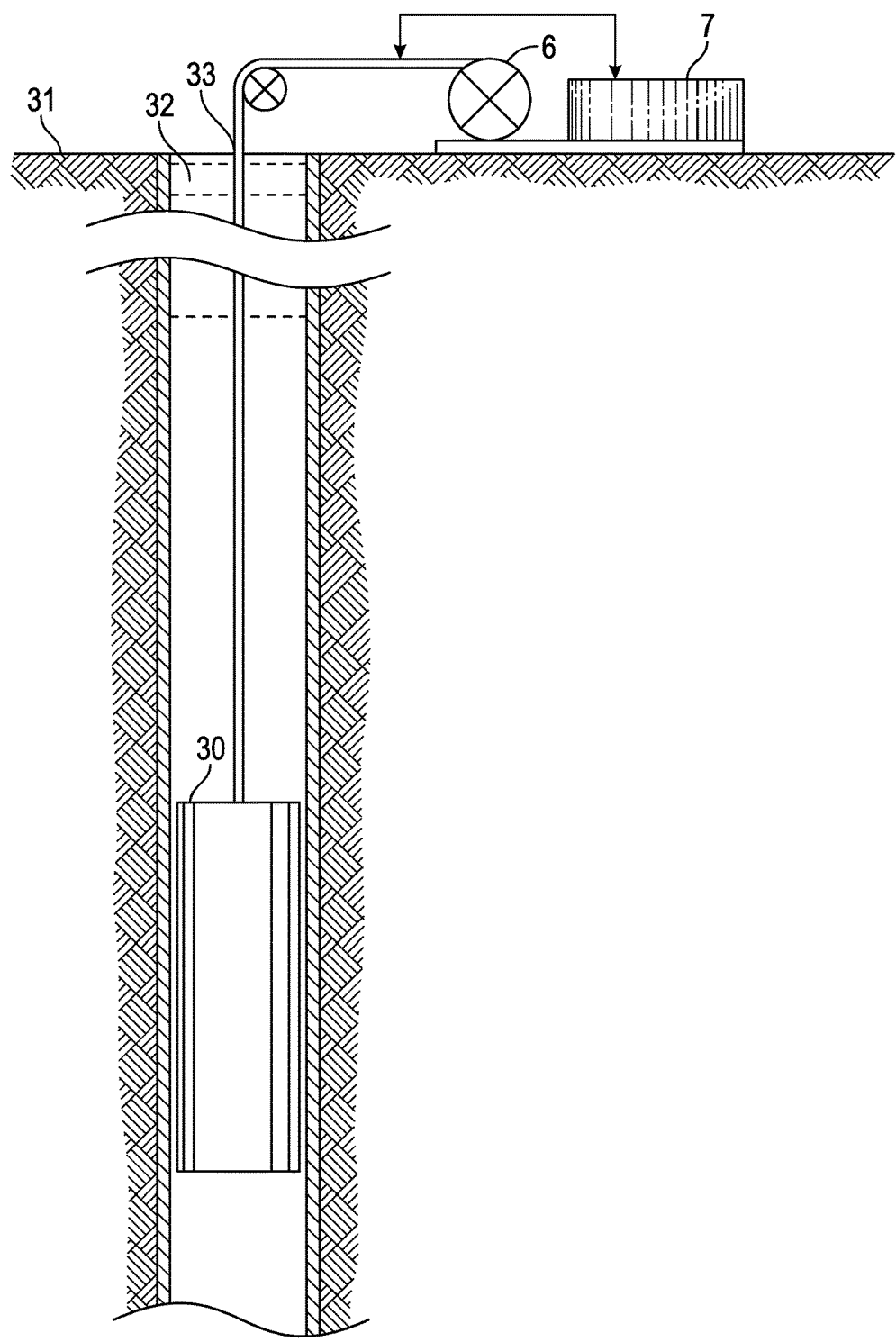
FIG. 1A is a schematic diagram of a subterranean wireline well logging system that includes an electromagnetic logging tool, wherein the system of FIG. 1 is capable of performing an inversion on electromagnetic measurements acquired using the electromagnetic logging tool to obtain formation evaluation parameters in accordance with aspects of the present disclosure.
Figure 1B:
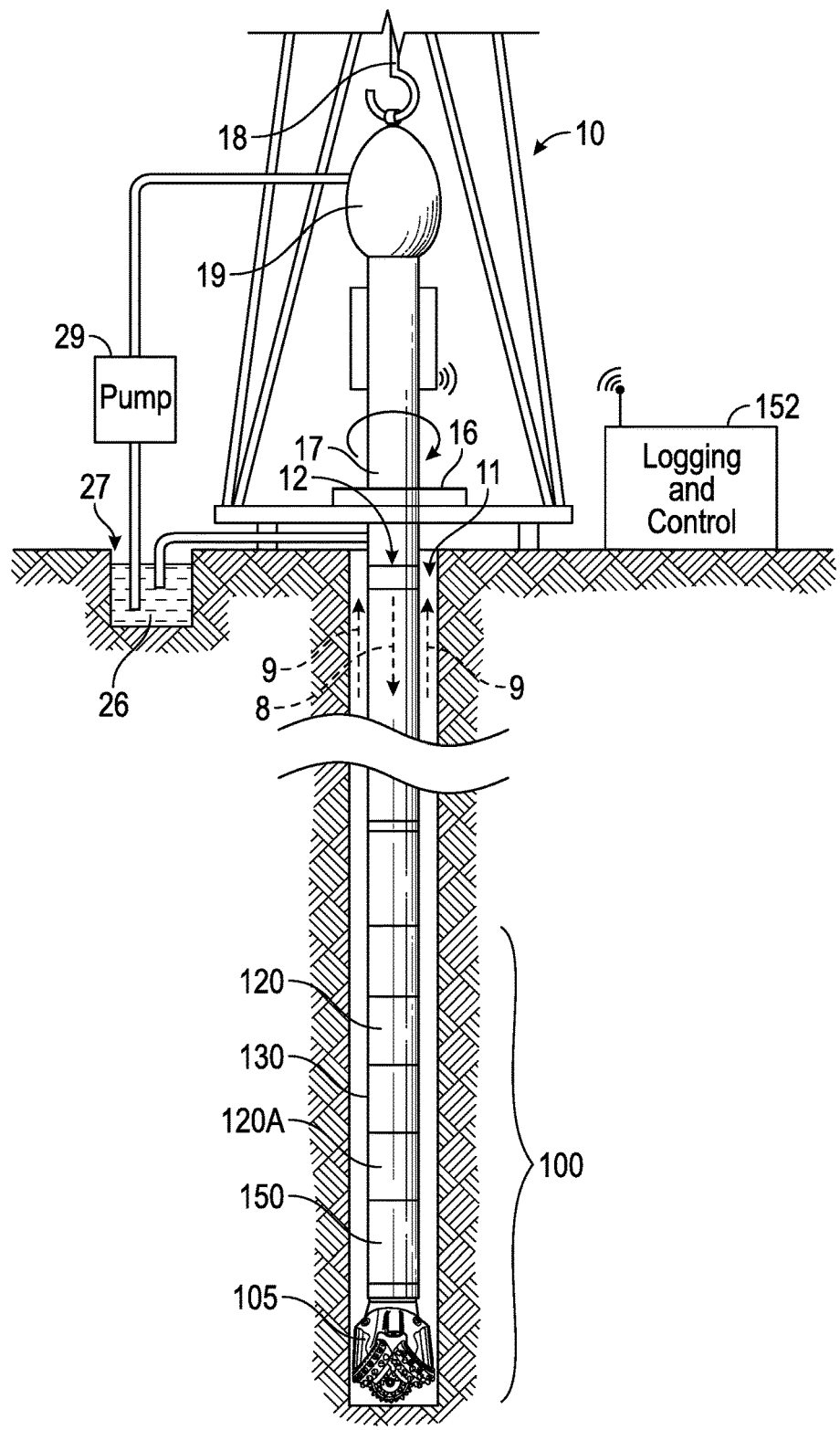
FIG. 1B is a schematic diagram of a subterranean logging-while-drilling and/or measure-while-drilling well logging system that includes an electromagnetic logging tool, wherein the system of FIG. 1B is capable of performing an inversion on electromagnetic measurements acquired using the electromagnetic logging tool to obtain formation evaluation parameters in accordance with aspects of the present disclosure.

To provide some general background with respect to the field of well logging and formation evaluation, FIGS. 1A and 1B illustrate different types of well site systems, which can be deployed onshore or offshore. Specifically, FIG. 1A illustrates a wireline system for investigating earth formations. As shown, the system includes an electromagnetic logging device 30 for investigating earth formations 31 traversed by a borehole 32. The electromagnetic logging device 30 is suspended in the borehole 32 on an armored cable 33 (e.g., a wireline cable), the length of which substantially determines the relative axial depth of the device 30. As can be appreciated, the cable length is controlled by suitable means at the surface such as a drum and winch mechanism 6. Surface equipment 7 can be of conventional types and can include a processor-based system which communicates with downhole equipment including electromagnetic logging device 30. The electromagnetic logging device 30 may be a multi-axial electromagnetic logging tool, such as a triaxial tool.

FIG. 1B shows another example of another type of well site system for logging-while-drilling (LWD) and/or measurement-while-drilling (MWD) applications. Here, a borehole 11 is formed in subsurface formations by rotary drilling in a manner that is well known. Some embodiments can also use directional drilling. As shown, a drill string 12 is suspended within the borehole 11 and has a bottom hole assembly (BHA) 100 which includes a drill bit 105 at its lower end. The surface system includes platform and derrick assembly 10 positioned over the borehole 11, with the assembly 10 including a rotary table 16, kelly 17, hook 18 and rotary swivel 19. In operation, the drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In this example embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this manner, the drilling fluid lubricates the drill bit 105 and carries formation cuttings up to the surface as it is returned to the pit 27 for recirculation.

The BHA 100 of the illustrated embodiment includes a logging-while-drilling (LWD) module 120, a measuring-while-drilling (MWD) module 130, a rotary-steerable system and motor 150, and drill bit 105. The LWD module 120 may be housed in a special type of drill collar, as is known in the art, and can contain one or more types of logging tools. It will also be understood that more than one LWD and/or MWD module can be employed, as represented at 120A. The LWD module includes capabilities for measuring, processing, and storing information, as well as for communicating with the surface equipment. In the present embodiment, the LWD module 120 and/or 120A may include a multiaxial (e.g., triaxial) electromagnetic logging tool.

The MWD module 130 is likewise housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid 26, although other power and/or battery systems may also be employed. By way of example only, the MWD module 130 may include one or more of the following types of measuring devices: a weight-on-bit measuring device, a torque measuring device, a vibration measuring device, a shock measuring device, a stick/slip measuring device, a direction measuring device, and an inclination measuring device. The operation of the assembly 10 of FIG. 1B may be controlled using the logging and control system 152, which may include one or more processor-based computing systems. In the present context, a processor may include one or more microprocessors, such as one or more general-purpose microprocessors, application-specific microprocessors (ASICs), PLC, FPGA, SoC, or any other suitable integrated circuit capable of executing encoded instructions stored, for example, on tangible computer-readable media, or a combination of such processing components.

Instructions or data to be processed by the processor may be stored in a computer-readable medium, such as a memory device, which may include volatile memory, such as random access memory (RAM), non-volatile memory, such as read-only memory (ROM), or as a combination of RAM and ROM devices. Such memory may store a variety of information and may be used for various purposes, including data acquisition routines, logging inversion algorithms, modeling functions, graphical user interfaces, as well as any other suitable program, applications, or any other routines that may be executed by the well site systems in FIGS. 1A and 1B. The control system 152 may also include non-volatile storage for persistent storage of data and/or instructions. For instance, the non-volatile storage may include flash memory, a hard drive, or any other optical, magnetic, and/or solid-state storage media, or some combination thereof. Further, the control system 152 may include a network device that enables the control system 152 connect to a network, such as a local area network, a wireless network, or a cellular data network, and to communicate with other systems and devices over the network.

As will be explained in more detail below, the present disclosure relates to an inversion technique that provides for handling varying dip and azimuth within the framework of a 1D inversion technique. Illustrative embodiments of the inversion technique disclosed herein may be based on Taylor's expansion, which takes into account the effect of variation in dip and azimuth on the inversion. The application of this Taylor series expansion approximation in an inversion may be implemented in a relatively straightforward manner.

An inversion process, in accordance with one embodiment of the disclosure, may include a standard 1D inversion in which dip and azimuth are assumed constant over the inversion window at every iteration step, but with the addition of an additional iteration step in which dip and azimuth are allowed to change from bed to bed in the same inversion zone. In another embodiment, the dip azimuth is determined first before a standard 1D inversion, and is precluded from both the standard 1D inversion and the additional iteration step. In other words, dip azimuth is computed from raw data of the same tool directly or from other tool, and then fed to the forward solver of the inversion as a known parameter.

Generally, a standard 1D inversion includes at least 10 iterations. Therefore, the increase in processing bandwidth using the presently disclosed inversion techniques is generally insignificant, since only one additional iteration step is needed. Thus, assuming a 10-iteration standard 1D inversion, the increase in processing bandwidth and/or time by adding the additional iteration step may be approximately 10-20 percent. Additionally, in some implementations of the presently disclosed inversion techniques, it has been found that the increase in memory requirements is approximately 30 percent or less, with the increase in memory usage being caused primarily by the Jacobian matrix (for first order partial derivative), often the leading factor for memory consumption in 1D inversion methods. Overall, it will be appreciated by those skilled in the art that the inversion techniques described herein may be adapted for use with any electromagnetic logging tool that provides measurements sensitive to formation dip and/or dip azimuth.

Figures 2A, 2B:
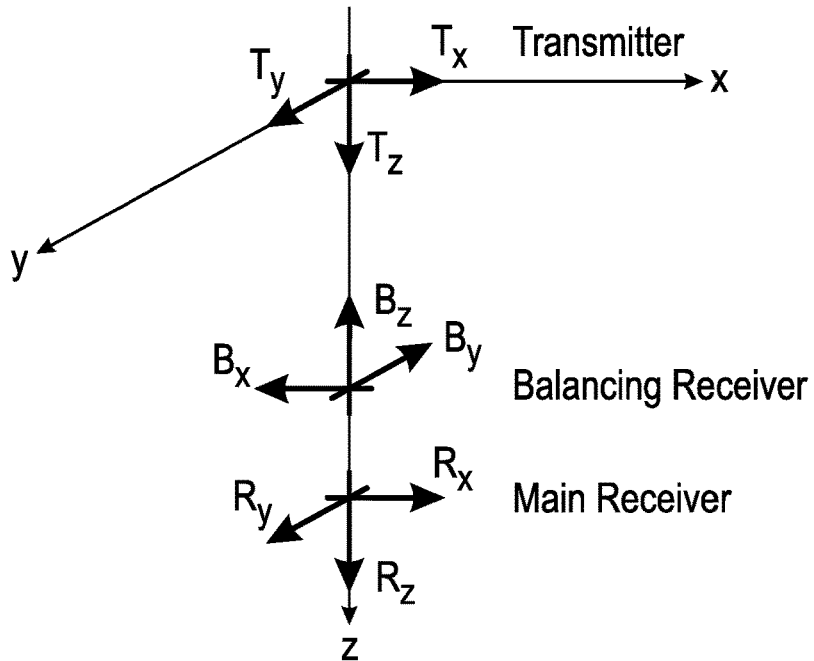
FIG. 2A illustrates an example triaxial transmitter and receiver arrangement in accordance with aspects of the present disclosure.
FIG. 2B illustrates a multiaxial resistivity tensor that may be measured using the transmitter and receiver arrangement of FIG. 2A.

As an example only, an electromagnetic logging tool used in conjunction with the well systems shown in FIGS. 1A and 1B may include a triaxial electromagnetic induction tool that has collocated triaxial transmitter (represented by $T_x$, $T_y$, $T_z$) and receiver coils (represented by $R_x$, $R_y$, $R_z$) to provide formation dip and dip azimuth information. FIG. 2A shows one possible arrangement of a transmitter and a receiver on such a triaxial measurement tool. The typical receiver will include a main receiver ($R_x$, $R_y$, $R_z$) and a balancing or "bucking" receiver ($B_x$, $B_y$, $B_z$) that is used to cancel effects of direct induction between the transmitter and the main receiver. By way of example, an electromagnetic logging tool having transmitter-receiver configuration like that shown in FIG. 2 may be a model the RT Scanner® tool, a triaxial induction logging tool available from Schlumberger Technology Corporation of Sugar Land, Tex.

Figure 2C:
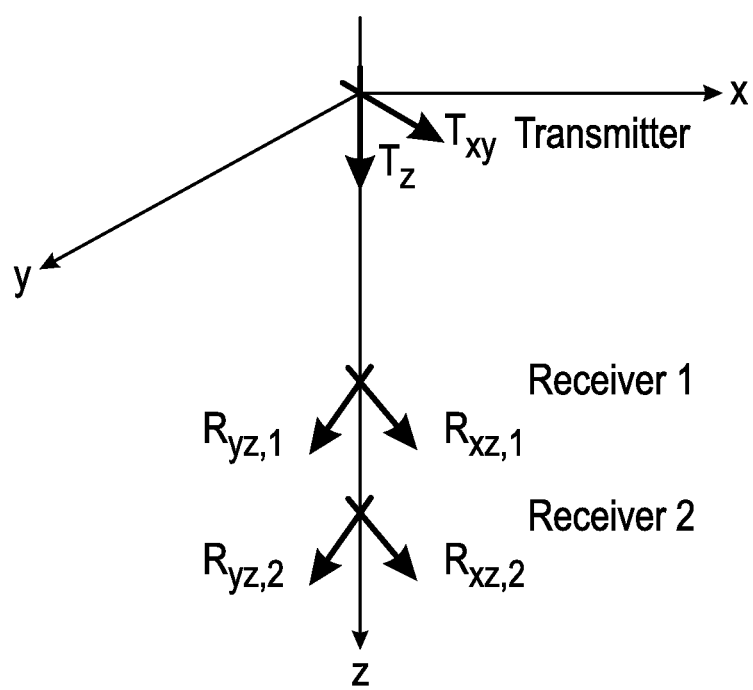
FIG. 2C illustrates an example of a transverse transmitter and tilted receiver arrangement in accordance with aspects of the present disclosure.

Measuring formations properties of a formation from within a wellbore using a triaxial electromagnetic logging tools generally includes measuring nine component apparent conductivity tensors ($\sigma_a(i,j,k)$, j,k=1,2,3), at multiple distances between an electromagnetic transmitter and the respective receivers, represented by index i. FIG. 2B illustrates a vector the nine component apparent conductivity tensor for one distance (spacing) that may be acquired using the transmitter/receiver arrangement shown in FIG. 2A. FIG. 2C shows another embodiment of an electromagnetic logging tool design that incorporates transverse transmitter ($T_{xy}$) and titled receivers ($R_{yz,1}$, $R_{xz,1}$, $R_{yz,2}$, $R_{xz,2}$). It will be understood that any embodiment of the electromagnetic tool designs incorporating off-borehole axis transmitter and/or receiver coils, and any embodiment of the electromagnetic tool designs incorporating only co-borehole axis transmitter and receiver coils (e.g., in the axial, or z-direction) but traversing a formation at a high relative dip, are able to provide measurements sensitive to formation dip and/or dip azimuth.

The measurements are usually obtained in the frequency domain by operating the transmitter with a continuous wave (CW) of one or more discrete frequencies to enhance the signal-to-noise ratio. However, measurements of the same information content could also be obtained and used from time domain signals through a Fourier decomposition process. This is a well known physics principle of frequency-time duality.

Formation properties, such as horizontal and vertical conductivities (Rh, Rv), relative dip angle (θ) and the dip azimuthal direction (Φ), as well as borehole/tool properties, such as mud conductivity (σmud), hole diameter (hd), tool eccentering distance (decc), tool eccentering azimuthal angle (ψ), can all affect these conductivity tensors. The effects of the borehole/tool to the measured conductivity tensors may be very large even in an oil base mud (OBM) environment. Through an inversion technique, the above borehole/formation parameters may be calculated and the borehole effects can be removed from the measured conductivity tensor. Some examples of techniques for removing borehole effects are discussed in commonly assigned International Patent Application Publication No. WO2013/036896, hereby incorporated by reference in its entirety.

As discussed above, the inversion techniques described herein are applicable to the measurements acquired with such tool designs to provide formation resistivity (Rh and Rv), dip (θ) and/or dip azimuth (Φ) in the framework of a 1D inversion scheme, but with fewer 3D effects and improved accuracy. Specifically, embodiments of the present technique, which are particularly well suited for complex formations with slowly varying dip and/or dip azimuth, provide an approximate forward model using a standard 1D formation model. A standard 1D inversion is thus performed on an inversion zone (or window) where dip and/or dip azimuth are assumed to be constant and, thereafter, an additional inversion using a Taylor expansion is performed using the approximate forward model, but allowing dip and/or dip azimuth to vary within the same inversion zone. For the purposes of this disclosure and to better differentiate from standard 1D inversion algorithms, the inversion techniques described herein may be referred to as "extended 1D inversions."

Several examples on different types of Taylor series expansions will now be described to better explain the implementation of the extended 1D inversion process. They may be used in the described extended 1D inversion as an approximate forward model. The application of these Taylor series expansions to an extended 1D inversion will then be described thereafter. The examples include: (1) Complete Taylor's Expansion in Both Dip and Azimuth up to First Order; (2) Approximated Taylor's Expansion in Both Dip and Azimuth up to First Order; (3) Taylor's Expansion in Both Dip and Azimuth up to Zeroth Order; (4) Completed Taylor's Expansion in Dip (but not Azimuth) up to First Order; (5) Approximated Taylor's Expansion in Dip (but not Azimuth) up to First Order; and (6) Approximated Taylor's Expansion in Dip (but not Azimuth) up to Second Order. The use of "complete" herein when describing such expansions refers to expansions that include the contribution from dip and azimuth of every bed in the formation model. The use of "approximate" or "approximated" herein when describing such expansions refers to expansions that include the contribution from dip and azimuth of only a host bed, wherein the host bed is where the sensitivity center of the measurement is located.

Figure 3:
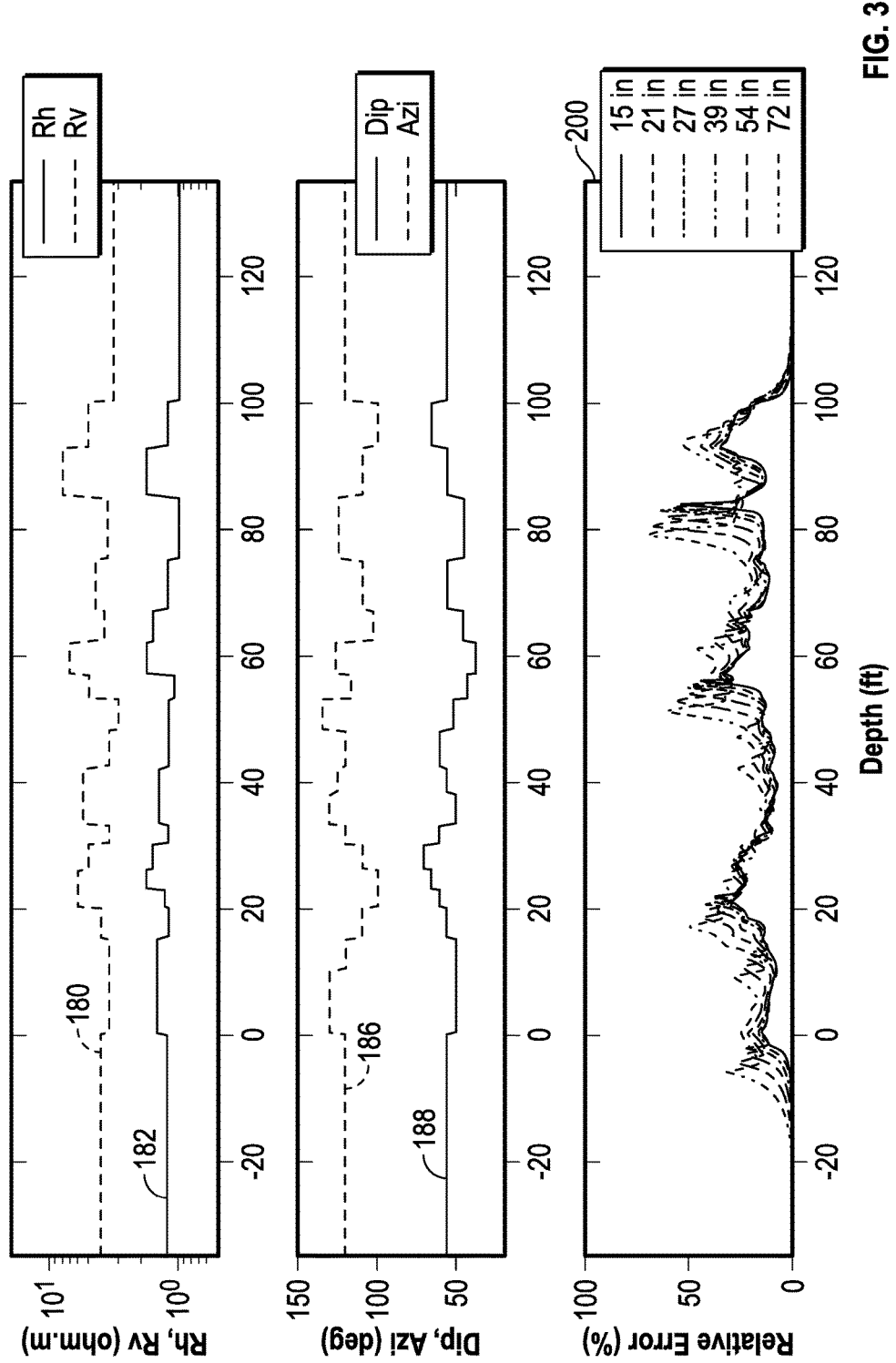
FIG. 3 shows graphs of horizontal resistivity, vertical resistivity, dip and dip azimuth over a given depth zone, and also shows a graph depicting the relative error between a 1D model (using a zero-th order Taylor series expansion for dip and dip azimuth) and an exact 3D model for various array spacings of an electromagnetic logging tool in accordance with aspects of the present disclosure.

The examples described below are discussed with reference to a synthetic formation model with varying dip and azimuth that is derived from an actual field study. Referring to FIG. 3, the top panel of FIG. 3 depicts both vertical resistivity (Rv—as curve 180) and horizontal resistivity (Rh—as curve 182) of the formation. The middle panel of FIG. 3 shows the dip (curve 188) and dip azimuth (curve 186) of the formation in the same depth zone.

As can be seen, the dip and dip azimuth over the depth zone shown in FIG. 3 are varying, wherein the level of variation describes the complexity of the formation. Thus, the formation is obviously no longer 1D (which assumes a constant dip and/or dip azimuth). In the present example, the background dip and dip azimuth of the example formation are 55 degrees and 120 degrees, respectively. When the actual varying dip and dip azimuth are replaced with their background counterparts, the formation model degenerates to a 1D formation model.

Example 1: Completed Taylor Series Expansion in Both Dip and Azimuth—First Order Keeping the above example formation in mind, an example of a first order Taylor series expansion for both dip and dip azimuth is now described. That is, the measurement is expanded in terms of dip and dip azimuth up to the first order. In this example, the following parameters are defined: $\sigma_a$ designates any one of the 9 components of the apparent conductivity tensor (FIG. 2B) at a given depth in the inversion zone; $\alpha_n$ and $\beta_n$ represent dip and dip azimuth, respectively, of bed i, i=1 . . . N, where N is the number of beds in the inversion zone; vector $\alpha$ is a vector containing the dips of all beds; and $\beta$ is a vector containing the dip azimuths of all beds; and $\alpha_0$ and $\beta_0$ represent the background dip and dip azimuth, respectively.

In this example, consider the first order Taylor's expansion of $\sigma_a$ in both dip and dip azimuth, which is given by:

$$\sigma_a(\alpha, \beta) \approx \sigma_a(\alpha_0, \beta_0) + \sum_{i=1}^{N} \frac{\partial \sigma_a(\alpha_{i,0}, \beta_{i,0})}{\partial \alpha_i}(\alpha_i - \alpha_0) + \sum_{i=1}^{N} \frac{\partial \sigma_a(\alpha_{i,0}, \beta_{i,0})}{\partial \beta_i}(\beta_i - \beta_0) \quad (1)$$

In the above expansion, $\alpha_0 = (\alpha_{k,0})$, $\beta_0 = (\beta_{k,0})$, where $\alpha_{k,0} = \alpha_0$, and $\beta_{k,0} = \beta_0$. It is understood that, $\alpha_0$ and $\beta_0$ correspond to the 1D background and, therefore, $\sigma_a(\alpha_0, \beta_0) = \sigma_a^{1D}(\alpha_0, \beta_0)$. The derivatives of $\sigma_a$ with respect to $\alpha_i$ and $\beta_i$ may be found by first computing the derivatives of the magnetic field with respect to $\alpha_i$ and $\beta_i$ in the bedding coordinate system with the following equations:

$$\frac{\partial H_{n_T n_R}}{\partial \alpha_i} = I_m l(\sigma_{v,i} - \sigma_{h,i}) \int_{V_i} d\vec{r}'(E_{x,n_R} E_{z,n_T} + E_{x,n_T} E_{z,n_R}) \quad (2)$$

$$\frac{\partial H_{n_T n_R}}{\partial \beta_i} = I_m l(\sigma_{v,i} - \sigma_{h,i}) \sin\theta \int_{V_i} d\vec{r}'(E_{y,n_R} E_{z,n_T} + E_{y,n_T} E_{z,n_R}) \quad (3)$$

In the above, $I_m l$ is the dipole moment of the source corresponding to the transmitter coil, and the transmitter and receiver coils are oriented in the $n_T$ and $n_R$ directions, respectively. $E_{n_T} = (E_{x,n_T}, E_{y,n_T}, E_{z,n_T})^t$ and $E_{n_R} = (E_{x,n_R}, E_{y,n_R}, E_{z,n_R})^t$ are the electric field due to a source with a unit dipole moment corresponding to the transmitter coil and an adjoint electric field due to a source with a unit dipole moment corresponding to the receiver coil, respectively; $\sigma_{h,i}$ and represent horizontal conductivity and vertical conductivity of bed i, respectively; θ is the bedding dip in the tool coordinates, which is identical to $\alpha_0$, the background dip as aforementioned; $V_i$ designates the support of bed i. Here, the bedding coordinate system may be defined such that the z-axis is along the normal to the bedding plane of the formation; and x- and y-axes are within the bedding plane. The tool coordinate system is defined such that the z-axis is along the tool axis; and x- and y-axes are within the tool plane, or the plane perpendicular to the tool axis. This process is repeated for each possible combination of transmitter and receiver coils (and bucking coil wherever applicable) in order to find derivatives of all possible couplings of the magnetic field tensor. Once the derivatives of magnetic field $H_{n_R n_T}$ with respect to $\alpha_i$ and $\beta_i$ are found, they may be calibrated straightforwardly to those of apparent conductivity $\sigma_\alpha$ with respect to $\alpha_i$ and $\beta_i$.

Even though the method for computing derivatives of apparent conductivity $\sigma_\alpha$ with respect to $\alpha_i$ and $\beta_i$ are presented in the above, i.e., those given in Equations (2) and (3) and the associated description, it will be apparent to those skilled in the art that variations may be applied to the above method in other embodiments. The variations may include but are not limited to applying the above method to formations which are not non-magnetic, i.e. where the magnetic permeability $\mu$ are not equal to vacuum magnetic permeability $\mu_0$; to sources which cannot be treated as point dipole; to electric-type sources; and to other types of measurements, e.g., phase shift and attenuation, etc.

Example 2: Approximated Taylor Series Expansion in Both Dip and Azimuth—First Order In another example embodiment, the measurements may be expanded in terms of dip and dip azimuth using Taylor expansion up to first order using an approximation for the derivatives of $\sigma_\alpha$ with respect to dip and dip azimuth. This may be given by:

$$\sigma_a(\alpha, \beta) \approx \qquad (4)$$
$$\sigma_a(\alpha_0, \beta_0) + \frac{\partial \sigma_a(\alpha_{n,0}, \beta_{n,0})}{\partial \alpha_n}(\alpha_n - \alpha_0) + \frac{\partial \sigma_a(\alpha_{n,0}, \beta_{n,0})}{\partial \beta_n}(\beta_n - \beta_0)$$

It is noted that the above expansion is not a complete first order expansion anymore, in that only the contribution from what may be referred to as the "host bed" (bed n), where the sensitivity center of $\sigma_\alpha$ falls, is considered in this example. The contributions from beds other than bed n are ignored. The sensitivity center of $\sigma_\alpha$ is a place in the formation where $\sigma_\alpha$ exhibits the highest sensitivity. In one embodiment, the approximation of the $\sigma_\alpha$ derivative (first order in this case) with respect to dip and dip azimuth may be found in accordance with the following equations:

$$\frac{\partial \sigma_a(\alpha_{n,0}, \beta_{n,0})}{\partial \alpha_n} \approx \frac{\partial \sigma_a^{1D}(\alpha_0, \beta_0)}{\partial \alpha} \qquad (5)$$

$$\frac{\partial \sigma_a(\alpha_{n,0}, \beta_{n,0})}{\partial \beta_n} \approx \frac{\partial \sigma_a^{1D}(\alpha_0, \beta_0)}{\partial \beta} \qquad (6)$$

Essentially, the right hand sides of Equations (5) and (6) are obtained with the background 1D formation model. It was found that Equations (5) and (6) provide a good and suitable approximation as long as $\sigma_\alpha$ and $\sigma_\alpha^{1D}$ are in bed n and the bed is sufficiently thick. As an example, a bed thickness of 1 to 2 feet is probably considered too thin, although sufficient thickness can also depend in part on resistivity contrast. If the bed is thick enough, the left hand side and right hand side of each of Equations (5) and (6) will be equal at the center of the bed. Thus, substituting the right hand side terms of Equations (5) and (6) back into Equation (4) yields the following:

$$\sigma_a(\alpha, \beta) \approx \qquad (7)$$
$$\sigma_a^{1D}(\alpha_0, \beta_0) + \frac{\partial \sigma_a^{1D}(\alpha_0, \beta_0)}{\partial \alpha}(\alpha_n - \alpha_0) + \frac{\partial \sigma_a^{1D}(\alpha_0, \beta_0)}{\partial \beta}(\beta_n - \beta_0)$$

Note that this approximated embodiment differs from the first example (complete) where the derivatives were calculated in accordance with Equations (2) to (3).

Example 3: Approximated Taylor Series Expansion in Dip and Azimuth—Zero Order

This next example illustrates that the simplest Taylor series expansion of dip and dip azimuth can be a zero order expansion. That is, the simplest approximate solution is the one in the background formation:

$$\sigma_\alpha(\alpha, \beta) \approx \sigma_\alpha^{1D}(\alpha_0, \beta_0) \qquad (8)$$

This equation can be understood as the one invoked at the last step of a standard 1D inversion to evaluate the misfit between field and simulated data. Specifically, $\sigma_0$ and $\beta_0$ are understood as the inverted dip and azimuth obtained for the whole inversion zone. When the true formation is not 1D, the above equation represents a coarse approximation in that all the higher order terms (e.g., first order and higher) are ignored. Therefore, it is appropriate to refer to it as the zero or zero-th order approximation.

Example 4: Complete Taylor Series Expansion in Dip (without Azimuth)—First Order To provide a further example, in accordance with one embodiment of the present disclosure, the electromagnetic measurements are expanded in terms of dip up to the first order approximation while dip azimuth is determined prior to the inversion. For instance, in one embodiment, the dip azimuth may be computed from measurement of electromagnetic tools directly. As will be appreciated, some electromagnetic logging tools provide a full conductivity tensor measurement which can be used to extract dip azimuth directly from the tensor components rather than by an inversion. As an example only, certain models of Rt Scanner®, available from Schlumberger Technology Corporation, are capable of providing such measurements. Some techniques for extracting dip azimuth directly from tensor components have been disclosed in International Patent Application No. WO2008/137987 (commonly owned by the assignee of the present disclosure), Wu et. al., "*Determining Formation Dip From A Fully Triaxial Induction Tool*," presented at SPWLA 51st Annual Logging Symposium, Perth Australia, Jun. 19-23, 2010, Wang et al., "*Triaxial Induction Applications In Difficult and Unconventional Formations*," Transactions of the 53$^{rd}$ SPWLA Annual Logging Symposium, Paper G (2012), and Wu et al., "*Efficient Hierarchical Processing and Interpretation of Triaxial Induction Data in Formations With Changing Dip*," SPE 135442, presented at SPE Annual Technical Conference and Exhibition, Florence Italy, Sep. 19-22, 2010, all of which are incorporated herein by reference. These above-referenced publications generally discuss various techniques for obtaining dip azimuth prior to inversion or to find an initial guess or estimation of dip azimuth in a 1D inversion.

For the purposes of this disclosure, the finding of dip azimuth directly from tool measurements (rather than through an inversion) may be referred to as a "direct solution of dip azimuth," a "pre-computed dip azimuth" or the like. This direct solution of dip azimuth has been shown to provide a good estimation of dip azimuth in complex formations with varying dip and azimuth. Further, in other embodiments, direct solutions of dip azimuth may also be found from logging tools other than electromagnetic tools, such as imaging tools (e.g., micro-resistivity imaging tools, oil-base mud imaging tools), density tools, and so forth. By way of example only, such imaging tools may include a model of FMI® Fullbore Formation MicroImager or OBMI® Oil-Base MicroImager, both available from Schlumberger Technology Corporation. By using a pre-computed dip azimuth in inversion directly, an approximate solution for dip may be obtained using the following expression:

$$\sigma_a(\alpha, \beta) \approx \sigma_a^{1D}(\alpha_0, \beta_m) + \sum_{i=1}^{N} \frac{\partial \sigma_a(\alpha_0, \beta_m)}{\partial \alpha_i}(\alpha_i - \alpha_0) \qquad (9)$$

Here, the derivative of $\sigma_\alpha$ with respect to dip may be determined as described above with respect to Equation (2). In the above expansion and hereafter, $\beta_m$ is the dip azimuth at the place corresponding to the sensitivity center of $\sigma_\alpha$, which may be found based on data from the above-described electromagnetic tool for example. It is understood that the reverse is also possible, i.e., if dip is known or pre-computed, one can solve for azimuth using a similar expansion.

Example 5: Approximated Taylor Series Expansion in Dip (without Azimuth)—First Order In another example, the measurement $\sigma_\alpha$ is expanded in terms of dip up to first order while dip azimuth is found before inversion using the approximation for the derivative of $\sigma_\alpha$ with respect to dip. The methods with which the dip azimuth are found is described above, wherein the approximation may be given by:

$$\sigma_a(\alpha, \beta) \approx \sigma_a^{1D}(\alpha_0, \beta_m) + \frac{\partial \sigma_a^{1D}(\alpha_0, \beta_m)}{\partial \alpha}(\alpha_n - \alpha_0) \qquad (10)$$

In the above, the contribution from bed n is retained while those from all the other beds are neglected. In addition, the derivative of $\sigma_\alpha$ with respect to dip is replaced with the one from the standard 1D inversion in the inverted 1D model. Using the approximations in Equations (9) and (10) means that the dip azimuth will not be solved for in the inversion anymore. The pre-computed dip azimuth may be used as the solution to dip azimuth instead. Moreover, the dip azimuth found this way may be different from depth point to depth point, instead of being a constant over the inversion zone. Such a point-by-point dip azimuth is similar to what is offered by some prior arts based upon a formation model in which resistivity is assumed constant in the direction along borehole axis.

Example 6: Approximated Taylor Series Expansion in Dip (without Azimuth)—Second Order In another embodiment, the measurement may be expanded in terms of dip up to the second order while dip azimuth is again determined prior to inversion (pre-computed). Moving forward one more step from Equation (10), the second order approximation can be obtained as follows:

$$\sigma_a(\alpha, \beta) \approx \sigma_a^{1D}(\alpha_0, \beta_n) + \qquad (11)$$
$$\frac{\partial \sigma_a^{1D}(\alpha_0, \beta_n)}{\partial \alpha}(\alpha_n - \alpha_0) + \frac{1}{2} \frac{\partial^2 \sigma_a^{1D}(\alpha_0, \beta_n)}{\partial \alpha^2}(\alpha_n - \alpha_0)^2$$

As can be seen, the approximation set forth in Equation (11) includes the second derivative of dip. From a computational standpoint, finding the second derivative in addition to the first derivative may increase processing time (e.g., approximately double in some cases) for dip derivative computation.

The performance of different approximation examples presented above can be evaluated by comparing them against a 3D formation model. For example, to evaluate performance of these approximation techniques, tool responses for different transmitter-receiver array spacings (15, 21, 27, 39, 54, and 72 inches) in the formation were simulated with a 3D finite difference method. By way of example only, an electromagnetic logging tool having spacings similar to these may be a model of the above-mentioned RT Scanner® tool. This set of synthetic data is considered exact in the sense that there is no approximation invoked in the computation except for the numerical error.

A 1D forward solver is then invoked to compute the tool response and its derivatives with respect to dip and dip azimuth in the background 1D formation. The tool response and the derivatives in the background 1D formation are then substituted in the approximate 3D models in Equations (7), (10), and (11) respectively to find an approximate 3D response for all arrays. These comparisons are summarized in FIGS. 3 and 4. Specifically, the bottom panel 200 of FIG. 3 shows the relative error percentages (representing data misfit of the simulated data) between the 1D formation model given in Equation (8) (zero order expansion for dip and dip azimuth) and the exact 3D formation model for the various example array spacings given above (from 15 to 72 inches). As will be appreciated, Equation (8) may be referred to an approximation of a 1D formation model, since dip and azimuth are assumed constant throughout the entire model for the zero-th order case (e.g., higher order terms are ignored).

Figure 4:
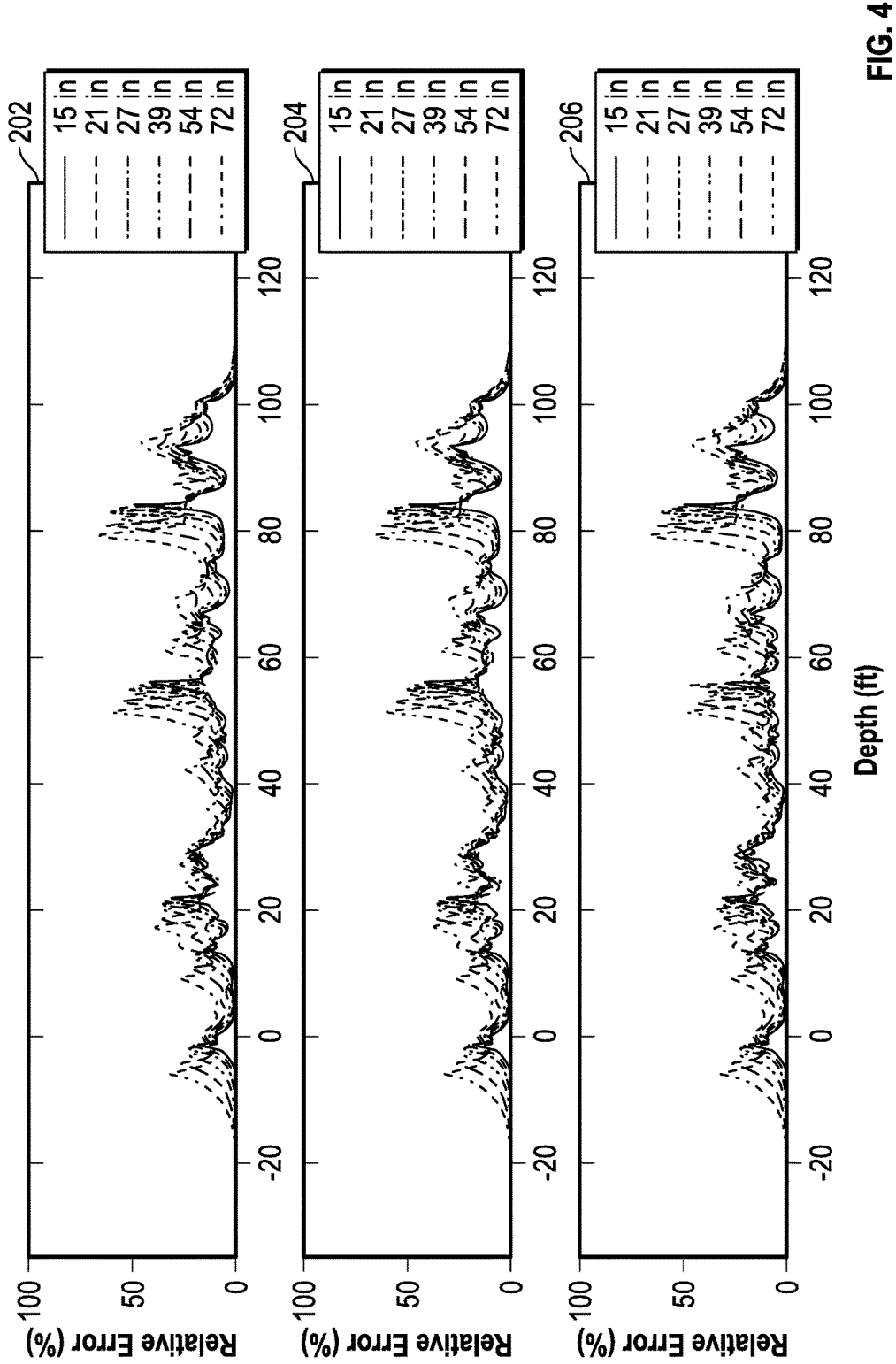
FIG. 4 shows graphs depicting relative error between several approximated 3D models using Taylor series expansion and exact 3D models for various array spacings of an electromagnetic logging tool in accordance with aspects of the present disclosure.
Figure 5:
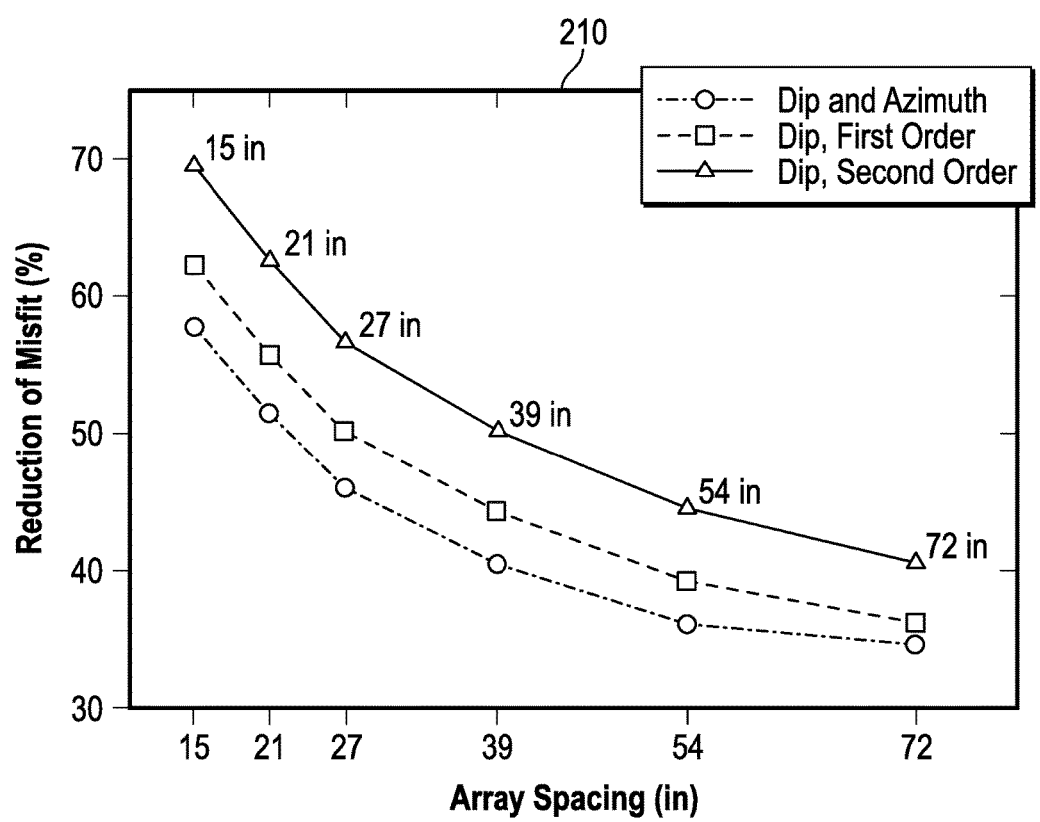
FIG. 5 is a graph showing the reduction of data misfit metrics in comparison to a 1D formation model for several different 3D model approximations using first and second order Taylor series expansion approximations in accordance with aspects of the present disclosure.

The top panel 202, middle panel 204, and bottom panel 206 of FIG. 4 show the relative error between the approximate 3D models given in Equations (7), (10), and (11) and the exact 3D model for the six example arrays spacings, respectively. The graph 210 in FIG. 5 shows the reduction of data misfit with the three approximate 3D models (from Equations (7), (10), and (11)). As can be seen in FIG. 5, the last approximate model given by Equation (11) provides the best accuracy in that it exhibits a greater reduction in data misfit than the other approximations shown in graph 210. Further, it can also be seen that among the different arrays, the shorter the array spacing is, the better the approximation is. For instance, for any of the given approximations, the shortest array, i.e. the 15 inch array, exhibits the largest reduction in data misfit.

While five examples of Taylor series expansion-based approximations are presented herein, i.e., those given in Equations (1), (7), (9), (10), and (11) (the zero order example in Equation (8) is not being considered an "expansion"), it will be apparent to those skilled in the art that a number of variations may be applied to the approximation of tool measurements without departing from the concept and scope of this disclosure. For example, in another embodiment, a possible variation is to expand the measurement in terms of Taylor series expansion up to the second order of both dip and dip azimuth of the bed where the sensitivity center of the measurement falls. It is noted that this is different from Equation (11) where dip azimuth is pre-computed. This can be expressed as follows:

$$\sigma_a(\alpha, \beta) \approx \qquad (12)$$
$$\sigma_a^{1D}(\alpha_0, \beta_0) + \frac{\partial \sigma_a^{1D}(\alpha_0, \beta_0)}{\partial \alpha}(\alpha_n - \alpha_0) + \frac{\partial \sigma_a^{1D}(\alpha_0, \beta_0)}{\partial \beta}(\beta_n - \beta_0) +$$
$$\frac{1}{2}\frac{\partial^2 \sigma_a^{1D}(\alpha_0, \beta_0)}{\partial \alpha^2}(\alpha_n - \alpha_0)^2 + \frac{1}{2}\frac{\partial^2 \sigma_a^{1D}(\alpha_0, \beta_0)}{\partial \beta^2}(\beta_n - \beta_0)^2$$

In a further embodiment, the second order cross partial derivative of dip and dip azimuth in expansion (12) may be further included:

$$\sigma_a(\alpha, \beta) \approx \sigma_a^{1D}(\alpha_0, \beta_0) + \frac{\partial \sigma_a^{1D}(\alpha_0, \beta_0)}{\partial \alpha}(\alpha_n - \alpha_0) + \qquad (13)$$
$$\frac{\partial \sigma_a^{1D}(\alpha_0, \beta_0)}{\partial \beta}(\beta_n - \beta_0) + \frac{1}{2}\frac{\partial^2 \sigma_a^{1D}(\alpha_0, \beta_0)}{\partial \alpha^2}(\alpha_n - \alpha_0)^2 +$$
$$\frac{1}{2}\frac{\partial^2 \sigma_a^{1D}(\alpha_0, \beta_0)}{\partial \beta^2}(\beta_n - \beta_0)^2 + \frac{\partial^2 \sigma_a^{1D}(\alpha_0, \beta_0)}{\partial \alpha \partial \beta}(\alpha_n - \alpha_0)(\beta_n - \beta_0)$$

As will be appreciated, many other variations are still possible. For example, in still a further embodiment, another variation is to expand the measurement in term of dip up to the second order, but in terms of dip azimuth to the first order. In yet another embodiment, the measurement may be expanded in terms of dip to the first order, but in terms of dip azimuth up to the second order. Moreover, it should be understood that the presently disclosed techniques are not limited to use of a Taylor series expansion for the approximation of tool measurements in the framework of a 1D formation model. Rather, other types of mathematical expansions may be developed within the framework of a 1D formation model.

Extended 1D Inversion to Complex Formations with Slowly Varying Dip and Azimuth

The present section will now discuss in more detail how the example approximations given above may be applied to an extended 1D inversion. Using the Born approximation techniques as an analogy, it can be appreciated that just as with Born approximation techniques where one is able to determine higher-dimensional resistivity distributions using a simple background, the presently described Taylor series expansion approximation techniques allow for acquisition of more complex formation image using a 1D formation model. It is also noted that the Born approximation is a linear approximation. In certain embodiments, the approximation techniques set forth in the present disclosure may be linear approximations as well, or may be quadratic approximations (e.g., having at least one second order term) in some instances. It should be understood that the Taylor series expansion approximations given above are generally most effective when the deviation of anomaly from the background medium is small (as is generally also the case for Born approximations). In other words, when practically applied to real world applications, the approximation techniques disclosed herein may work best when the dip and dip azimuth vary slowly along the borehole trajectory.

The following sections will explain in more detail how the extended 1D inversion process is performed.

Cost Function for the Standard 1D Inversion

In accordance with embodiments of the present disclosure, two passes of inversion are run in an extended 1D inversion. In the first pass, the extended 1D inversion is identical to a standard 1D inversion in the sense that dip and dip azimuth are assumed constant over the inversion zone, and an iterative solver is employed for the solution. Therefore, the unknown parameters are Rh, Rv in each bed, positions of each bed boundary, and a constant dip and dip azimuth over the inversion zone. In one embodiment, the cost function of the standard 1D inversion can be expressed as follows:

$$C(x) = \frac{1}{2}\|W_D[d(x) - d^{OBS}]\|_2^2 + \frac{1}{2}\lambda_R\|W_R(x - x_R)\|_2^2 + \qquad (14)$$
$$\frac{1}{2}\lambda_S\|W_S Dx\|_2^2 + \frac{1}{2}\lambda_B\|W_B p\|_2^2 + \frac{1}{2}\lambda\|x\|_2^2$$
$$x = (\sigma_h^t, \sigma_v^t, z^t, \alpha, \beta)^t$$
$$x_R = (\sigma_{h,R}^t, \sigma_{v,R}^t, z_R^t, \alpha_R, \beta_R)^t$$

In the above Equation (14), the formation is assumed to include N beds, with the two end beds being semi-infinitely thick. Therefore, horizontal and vertical conductivity $\sigma_h$ and $\sigma_v$ are each an N-dimensional vector, and bed boundary z is an (N−1)-dimensional vector. The formation dip $\alpha$ and dip azimuth $\beta$ are constant over the length of the inversion zone. Vector $x_R$ is a reference model which represents a reasonable estimation for x, the unknown model. The third term of Equation (14) is provided to produce a stable solution by limiting the variation of resistivity along the borehole trajectory, where the matrix D is a difference operator. The fourth term in Equation (14) is used to apply pre-established physical constraints with the plus function p, examples of which are given in Wang et al., "*Triaxial Induction Applications In Difficult and Unconventional Formations*," Transactions of the 53$^{rd}$ SPWLA Annual Logging Symposium, Paper G (2012), and Wu et al., "*Efficient Hierarchical Processing and Interpretation of Triaxial Induction Data in Formations With Changing Dip*," SPE 135442, presented at SPE Annual Technical Conference and Exhibition, Florence Italy, Sep. 19-22, 2010, both incorporated herein by reference. Further, the matrices $W_D$, $W_R$, $W_S$, and $W_B$ each represent the weighting coefficients for the components of the corresponding term. The final term in Equation (14) is used as a minimum length stabilizer, and the coefficients $\lambda_R$, $\lambda_S$, $\lambda_B$ and $\lambda$ used in Equation (14) represent the regularization coefficients of the corresponding terms.

It will be appreciated that the implementation of this pass of the inversion is the same as most standard 1D inversion algorithms. For example, the formation is first segmented into a number of zones, and the inversion is performed in the resultant subzones sequentially. Each subzone is referred to as an inversion zone. In the inversion of each inversion zone, dip and dip azimuth are assumed constant over the inversion zone (sometimes also called inversion window). The length of inversion zone is typically pre-selected before the inversion. As examples only, commonly used lengths for inversions zones may be in a range of approximately 20 to 100 feet. In one embodiment, an inversion window may be set to 30 feet, and further subdivided into upper, middle, and lower 10 feet sections. Using this example, only the results from middle section of the inversion may be output to reduce the truncation effect.

As discussed above in discussing the various Taylor series expansion approximation examples, the dip azimuth may be pre-computed in some cases (e.g., can be determined or otherwise derived directly from tool measurements without requiring an inversion). In such cases, dip azimuth will be precluded from inversion as aforementioned. However, if this is the case, it should be understood that the inversion is not necessarily based on a true 1D model, since dip azimuth may not be constant in the inversion zone. In such cases, the inversion is sometimes referred to as a "pseudo 1D inversion."

Cost Function at the Extended Step of the Extended 1D Inversion

After the standard 1D inversion in the first pass (discussed in the preceding section) is finished, a second pass is performed. In this second pass, the restriction on the variation of dip and dip azimuth within an inversion zone is lifted so that dip and dip azimuth can vary from bed to bed. For example, in one embodiment, the cost function from Equation (14) above is modified accordingly to accommodate this change as follows:

$$C(x) = \frac{1}{2}\|W_D[d(x) - d^{OBS}]\|_2^2 + \frac{1}{2}\lambda_R\|W_R(x - x_R)\|_2^2 + \qquad (15)$$

$$\frac{1}{2}\lambda_S\|W_S Dx\|_2^2 + \frac{1}{2}\lambda_B\|W_B p\|_2^2 + \frac{1}{2}\lambda\|x\|_2^2$$

$$x = (\sigma_h^t, \sigma_v^t, z^t, \alpha^t, \beta^t)^t$$

$$x_R = (\sigma_{h,R}^t, \sigma_{v,R}^t, z_R^t, \alpha_R^t, \beta_R^t)^t$$

When compared to the cost function of the first pass in Equation (14), the difference is that $\alpha$, $\beta$, $\alpha_R$ and $\beta_R$ are now each an N-dimensional vector, to be consistent with the aforementioned assumption (e.g., that dip and dip azimuth can vary within an inversion zone and from bed to bed). The matrices $W_R$ and $W_B$ can each be understood as being an updated form of these matrices resulting from the change in dip and dip azimuth. Further, in another embodiment, the dip azimuth can be pre-computed, and $\beta$ and $\beta_R$ will be precluded from the above formulation and hence from the inversion.

Referring now back to the first pass of the standard 1D inversion, the Jacobian matrix can be given as follows:

$$J = (J_h, J_v, J_z, J_\alpha, J_\beta) \qquad (16)$$

where $J_\eta$, $\eta = h,v$ is an M×N matrix, $J_\eta = (\partial \sigma_{a,m}/\partial \sigma_{\eta,n})$; $J_z$ is an M×(N−1) matrix, $J_z = (\partial \sigma_{a,m}/\partial z_n)$. Moreover, $J_\alpha$ and $J_\beta$ are given as:

$$J_\alpha = \left(\frac{\partial \sigma_{a,1}}{\partial \alpha} \quad \frac{\partial \sigma_{a,2}}{\partial \alpha} \quad \cdots \quad \frac{\partial \sigma_{a,M}}{\partial \alpha}\right)^t \qquad (17)$$

$$J_\beta = \left(\frac{\partial \sigma_{a,1}}{\partial \beta} \quad \frac{\partial \sigma_{a,2}}{\partial \beta} \quad \cdots \quad \frac{\partial \sigma_{a,M}}{\partial \beta}\right)^t \qquad (18)$$

In one embodiment, the derivatives with respect to bed boundaries (or Jacobian matrix $J_z$) are excluded from the inversion if bed boundaries are already obtained from other data. The same is true with the derivatives with respect to azimuth (or Jacobian matrix $J_\beta$) when the azimuth is directly computed from measurement data.

For the extended step in the second pass of the inversion, $J_h$, $J_v$ and $J_z$ remain the same, but $J_\alpha$ and $J_\beta$ are now each a full matrix, like $J_h$ and $J_v$. As discussed above, in one embodiment, $J_\alpha$ and $J_\beta$ may be found in accordance with Equations (2) and (3) above. In another embodiment, the full matrices for $J_\alpha$ and $J_\beta$ may be approximated via the following approximation to obtain $J_\alpha$ and $J_\beta$:

$$J_x = \begin{pmatrix} \frac{\partial \sigma_{a,1}}{\partial x_1} & \frac{\partial \sigma_{a,1}}{\partial x_2} & \cdots & \frac{\partial \sigma_{a,1}}{\partial x_N} \\ \frac{\partial \sigma_{a,2}}{\partial x_1} & \frac{\partial \sigma_{a,2}}{\partial x_2} & \cdots & \frac{\partial \sigma_{a,2}}{\partial x_N} \\ \vdots & \vdots & \ddots & \vdots \\ \frac{\partial \sigma_{a,M}}{\partial x_1} & \frac{\partial \sigma_{a,M}}{\partial x_2} & \cdots & \frac{\partial \sigma_{a,M}}{\partial x_N} \end{pmatrix} \approx (J_{x_1} \quad J_{x_2} \quad \cdots \quad J_{x_N}), \qquad (19)$$

$$x = \alpha, \beta$$

wherein:

$$J_{x_n} = \left(0 \quad \cdots \quad 0 \quad \frac{\partial \sigma_{a,m_{n,1}}}{\partial x_n} \quad \frac{\partial \sigma_{a,m_{n,1}+1}}{\partial x_n} \quad \cdots \quad \frac{\partial \sigma_{a,m_{n,2}}}{\partial x_n} \quad 0 \quad \cdots \quad 0\right)^t, \qquad (20)$$

$$x = \alpha, \beta$$

In Equation (20), $\sigma_{a,l}$, $l = m_{n,1}, \ldots, m_{n,2}$, are the measurements which fall in bed n. The rationale behind this approximation is that the measurements in bed n are most sensitive to the dip and dip azimuth in the same bed. Furthermore, for the problem to be tractable within the framework of 1D formation model, the approximations in Equations (5) and (6) given above are employed:

$$\frac{\partial \sigma_{a,l}}{\partial \alpha_n} \approx \frac{\partial \sigma_{a,l}^{1D}}{\partial \alpha}, \qquad (21)$$

$$\frac{\partial \sigma_{a,l}}{\partial \beta_n} \approx \frac{\partial \sigma_{a,l}^{1D}}{\partial \beta}. \qquad (22)$$

In other words, the derivatives with respect to dip and dip azimuth over the inversion zone may be used to approximate the derivatives with respect to those in bed n. The rationale for this approximation is the same as that discussed for Equation (20), i.e., that measurements in bed n are most sensitive to dip and dip azimuth in the same bed. Both approximations are based on the localized property of electromagnetic measurements. Particularly, $\partial \sigma_{a,l}/\partial \alpha_n$ corresponds to the change of $\sigma_{a,l}$ with respect to the change in the dip of bed n, whereas $\partial \sigma_{a,l}^{1D}/\partial \alpha$ corresponds to the change with respect to the change of dip in the whole inversion zone. It can be seen that these expressions are not identical. However, since $\sigma_{a,l}$ is in bed n, it is most sensitive to changes in dip within this bed. Therefore, the change of dip in bed n will typically dominate over the change of dip in all other beds of the formation model. This observation thus lays the foundation for Equations (21) and (22). In theory, the accuracy of Equations (21) and (22) is higher for measurements at the center of a thick bed. For this reason, it is sometimes useful to use a thick segmentation in the inversion process. In addition, in the extended step of the inversion, dropping the measurements closer to bed boundaries is expected to give generally a better dip estimation.

Further, as mentioned above, in certain embodiments, the dip azimuth can be computed directly without inversion. In such cases, the Jacobian matrix $J_\beta$ will not be invoked in the inversion and the approximation in Equation (20) regarding dip azimuth ($x=\beta$) and that in Equation (22) will be unnecessary.

While the approximation of the Jacobian matrix has been described with respect to a specific embodiment above, those skilled in the art will appreciate that variations may be applied to the approximation. For example, in one embodiment, the approximation is made on the Jacobian matrices of Rh and Rv in a way similar to that used for $J_\alpha$ and $J_\beta$, with derivatives with respect to Rh and Rv being set to zero in the beds other than the host bed (bed n) where the sensitivity center of the measurement falls. In so doing, $J_h$ and $J_v$ will be of the same structure as $J_\alpha$ and $J_\beta$. In other embodiments, a quadratic expansion (e.g., having at least one second order term) can be used, in which the measurements in terms of dip and/or dip azimuth are expanded to the second order (including but not limited to the examples shown above in Equations (11), (12), and (13)). Quadratic expansions of this type can be invoked to further improve the approximation of the Hessian matrix (e.g., a square matrix of second-order partial derivatives) of the cost function. It will be appreciated by those skilled in the art that the Hessian is the second order counterpart to the Jacobian, and the improvement on the Hessian in this manner is accomplished by providing the curvature information of the cost function (e.g., Equation (12)). See Habashy et al., "*A General Framework for Constraint Minimization for the Inversion of Electromagnetic Measurements*," Progress in Electromagnetic Research, vol. 46, pp. 265-312 (2004).

Again, it is also emphasized that the presently disclosed techniques are not limited to use of a Taylor series expansion for approximation of the Jacobian and Hessian matrices within the framework of a 1D formation model. Other suitable types of mathematical expansions may be developed within the framework of a 1D formation model.

Figure 6:
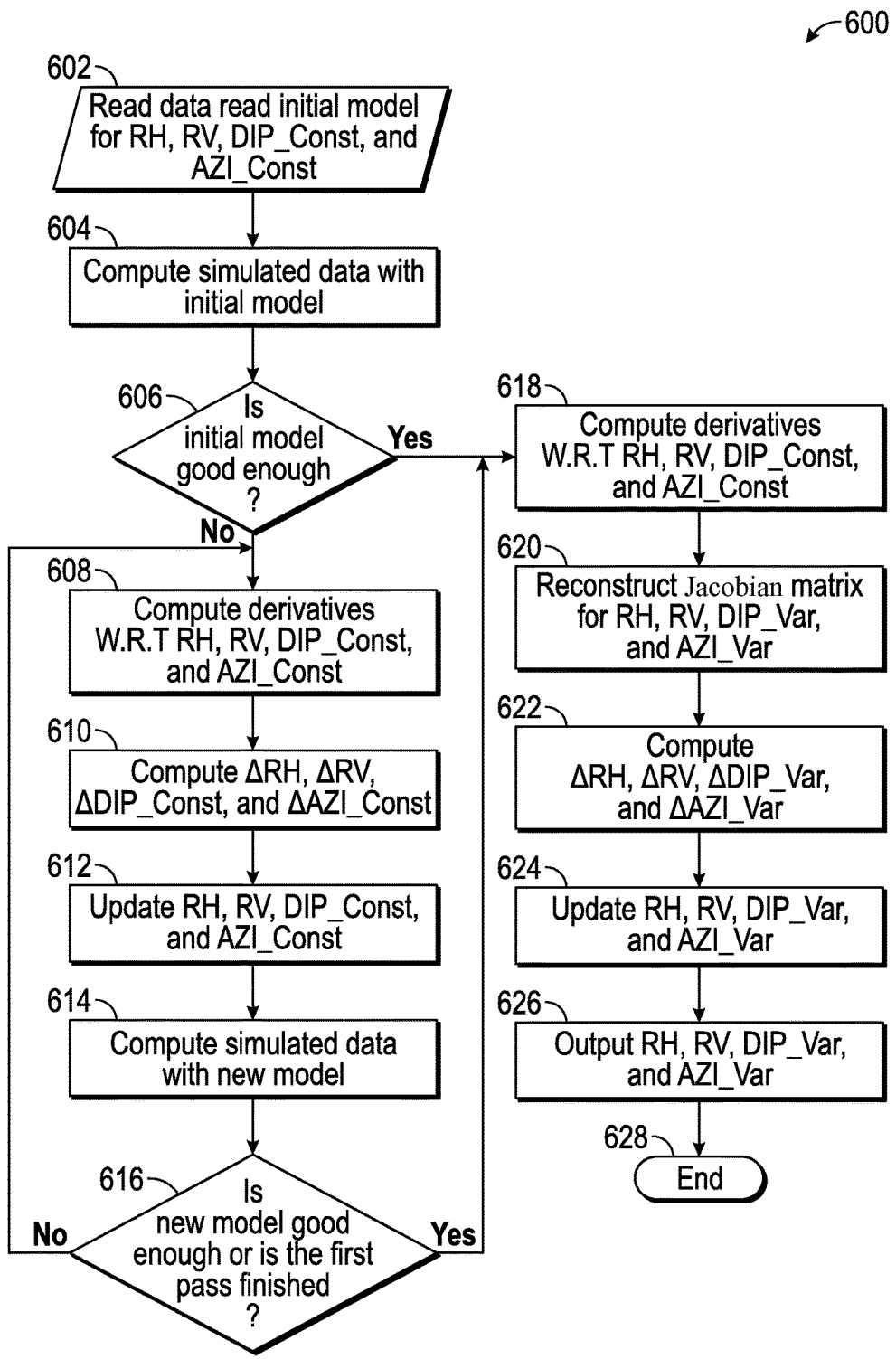
FIG. 6 is a flowchart depicting a process of performing an extended 1D inversion in which dip azimuth is an unknown parameter in accordance with aspects of the present disclosure.
Figure 7:
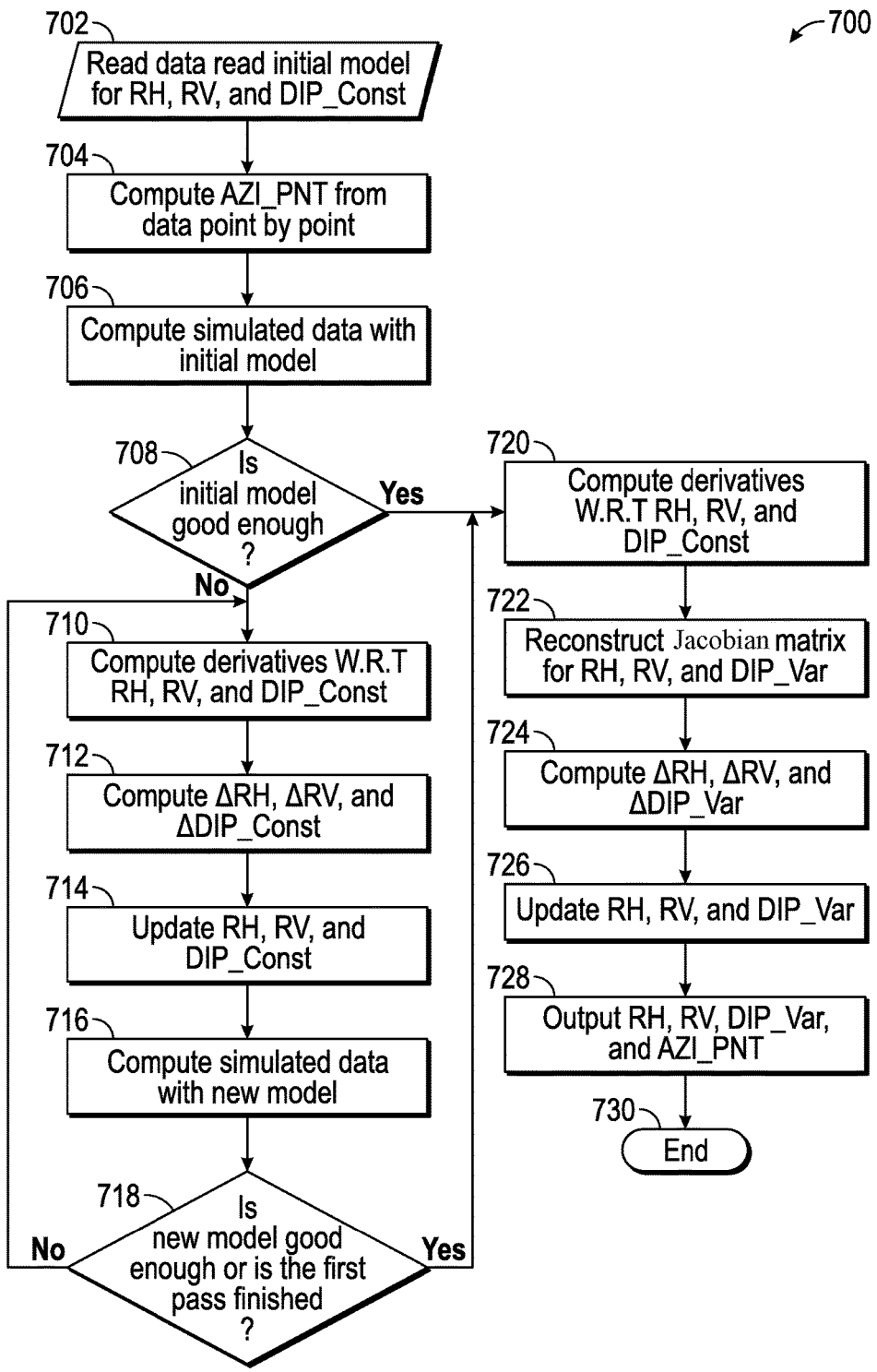
FIG. 7 is a flowchart depicting a process of performing an extended 1D inversion in which dip azimuth is determined prior to the inversion and provided to the inversion as a known parameter in accordance with aspects of the present disclosure.

FIGS. 6 and 7 provide flowcharts showing extended 1D inversion processes in accordance with embodiments of the present disclosure. For example, FIG. 6 shows the flowchart of one embodiment (600) in which both dip and dip azimuth are found via inversion. Specifically, dip and dip azimuth are first inverted in the first pass of a standard 1D inversion by assuming they are constant over the inversion zone (602, 604, 606, 608, 610, 612, 614, 616). Then, in a subsequent second pass of the inversion, they are allowed to change from bed to bed in the inversion zone, such that upon output, they are each a vector representing dip or dip azimuth in all beds (the same as the horizontal and vertical resistivity components), instead of a scalar corresponding to the whole inversion zone as in the first pass (618, 620, 622, 624, 626, 628).

FIG. 7 shows the flowchart of another embodiment (700) of the present disclosure in which only dip (and not dip azimuth) is found via inversion. Specifically, dip azimuth can be pre-computed, such as by being calculated or otherwise determined directly from tool measurements (e.g., computed with some components of the conductivity tensor as aforementioned). In this case, the dip azimuth is entered into the inversion as a known parameter, with the unknown parameters being horizontal and vertical resistivity, and formation dip. The dip is first inverted in the first pass of a standard 1D inversion by assuming it is constant over the inversion zone (702, 704, 706, 708, 710, 712, 714, 716, 718). Then, in the second pass of the inversion, dip is allowed to change from bed to bed in the inversion zone and, upon output, it returns a vector consisting of the dip of all beds (the same as horizontal and vertical resistivity vectors), instead of a scalar corresponding to the whole inversion zone as is the case in the first pass of the inversion (720, 722, 724, 726, 728, 730).

Application of the Extended 1D Inversion on Synthetic and Field Examples

This section of the disclosure is intended to provide some additional examples showing the application of the extended 1D inversion technique applied to both synthetic and field examples. In these examples, data from an orthogonally collocated multi-array induction tool was used to demonstrate the performance of the extended 1D inversion technique. The multi-array took may have a number of array spacings (e.g., 15, 21, 27, 39, 54, and 72 inches). One array is shown schematically in FIG. 2A. In the following examples, it can be assumed the azimuth is found from measurement data directly (pre-computed), so it will not be an unknown parameter in the inversion. In addition, for the examples discussed below, it can also be assumed that an inversion window of 30 feet is used, with the window further subdivided into upper, middle, and lower 10 feet sections. Using this example, only the results from middle section of the inversion may be output to reduce truncation effects.

Figure 8:
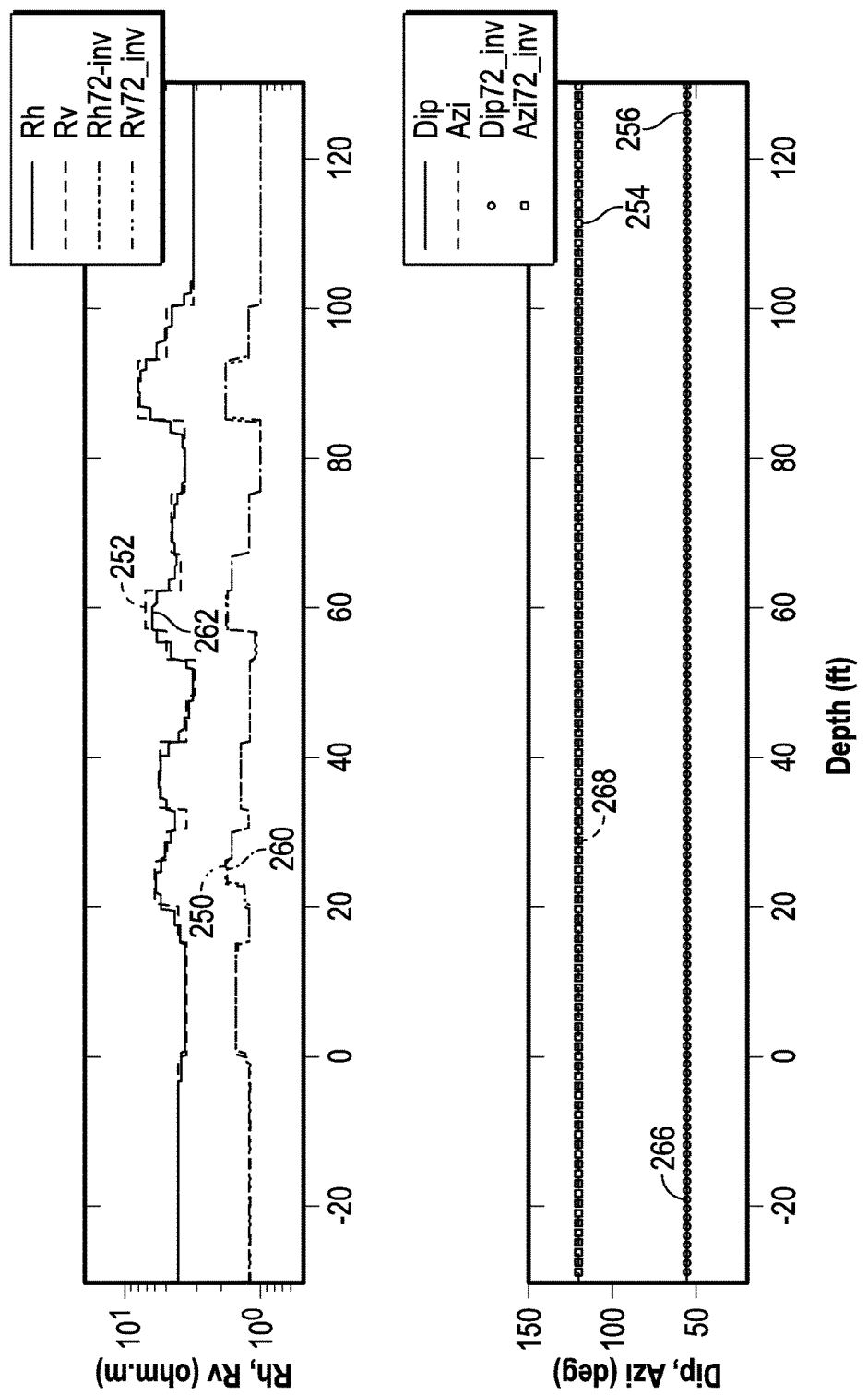
FIG. 8 shows an example of an extended 1D inversion in a 1D formation with constant dip and dip azimuth in accordance with aspects of the present disclosure.

With this in mind, FIG. 8 shows the extended 1D inversion in a 1D formation with constant dip and dip azimuth. The formation model is extracted from a field log as shown by the square logs of Rh (250) and Rv (252) in the upper panel. The true dip and dip azimuth are 55 degrees and 120 degrees respectively as shown by the circles (256) and squares (254) linked with straight lines in the lower panel of FIG. 8. The inverted Rh, Rv, and dip with a 72 inch array of an electromagnetic logging tool are shown in square logs (inverted Rh curve 260, inverted Rv curve 262) in the top panel, with inverted dip (circles 266) shown in the lower panel of FIG. 8. Though dip azimuth is labeled as "inverted", for this example, the dip azimuth is actually pre-computed from the raw data directly (represented by circles 268 in lower panel of FIG. 8). The results shown here indicate that as an inversion designed for complex formations with slowly varying dip and dip azimuth, the extended 1D inversion is able to provide fairly good estimations of Rh, Rv, dip and dip azimuth in 1D formations as a standard 1D inversion. It is noted that the approximation of $J_\alpha$, as given in Equations (20) and (21) may be employed in the extended inversion with respect to the following synthetic and field examples.

Figure 9:
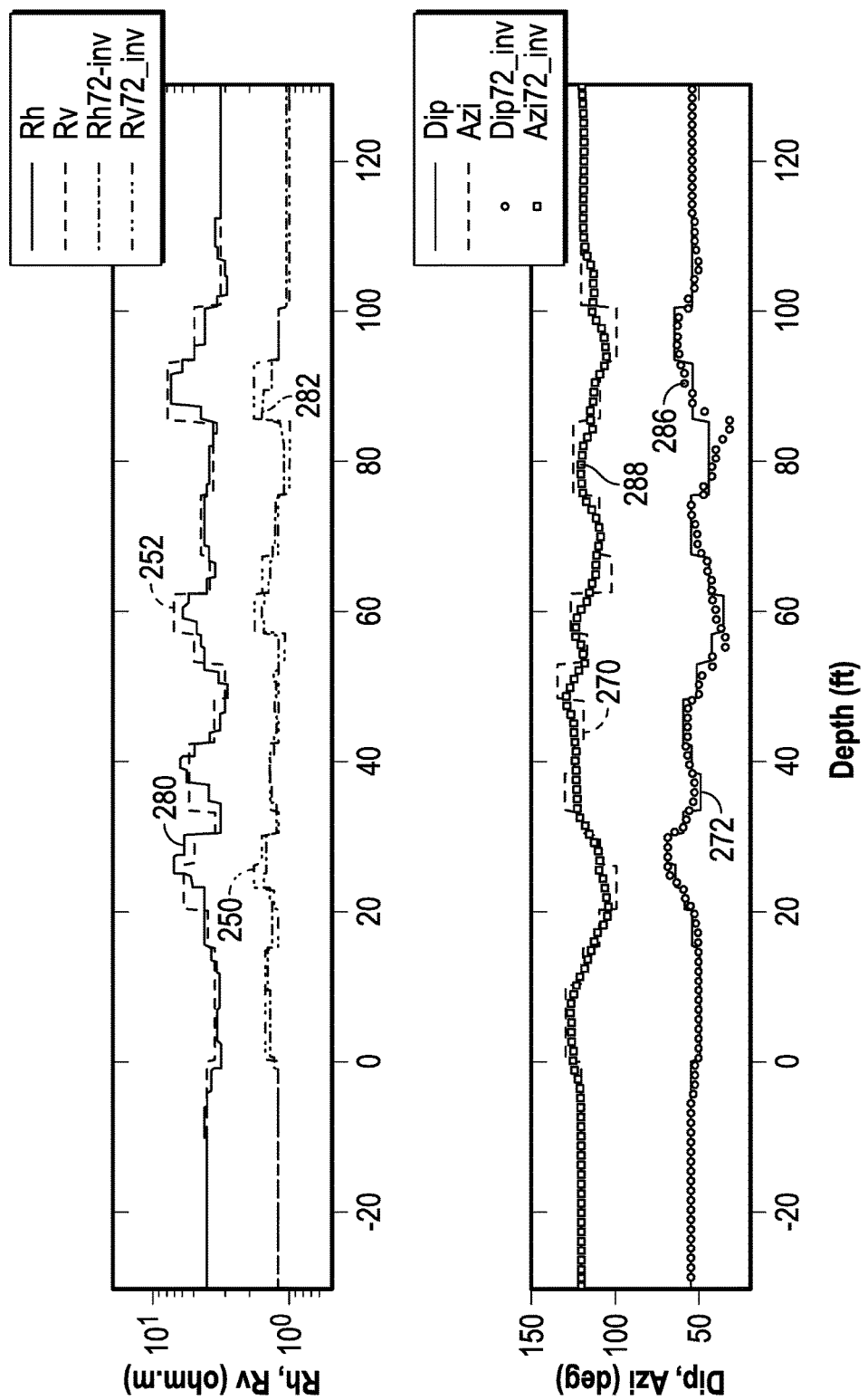
FIG. 9 shows an example of an extended 1D inversion in a non-1D (e.g., 3D) formation with varying dip and dip azimuth in accordance with aspects of the present disclosure.

FIG. 9 shows the inversion results as obtained with the extended 1D inversion in a 3D formation. In comparison to the above 1D formation, the difference is that now dip and dip azimuth are varying along the borehole trajectory over the whole depth zone. They are plotted as square logs (curve 270 for dip azimuth, curve 272 for dip) in the lower panel of FIG. 9. As can be seen, the dip varies from approximately 37 degrees to 70 degrees, and the dip azimuth can be varies from approximately 100 degrees to 135 degrees. The variation in dip is relatively larger than that in dip azimuth in this case. Formations with such level of variation in dip and dip azimuth are not uncommon in field cases. The Rh and Rv square logs (curves 250 and 252, respectively in FIG. 9) are the same as those from the FIG. 8 example and thus have been labeled with the same reference numbers.

The inverted Rh, Rv, and dip with the 72 inch array of the aforementioned example electromagnetic logging tool are shown in square logs (curve 280 for inverted Rv, curve 282 for inverted Rh), and circles 286 for inverted dip. The directly computed dip azimuth is also plotted in the lower panel of FIG. 9. Again, though labeled as "inverted", for this example, the dip azimuth is actually pre-computed from the raw data, such as directly from electromagnetic tool measurements (represented by circles 288 in lower panel of FIG. 9). These results show that in a complex formation (e.g., 3D), the extended 1D inversion can still provide a reasonable estimation of Rh, Rv, dip and dip azimuth. In particular, the dip estimation is greatly improved.

Figure 10:
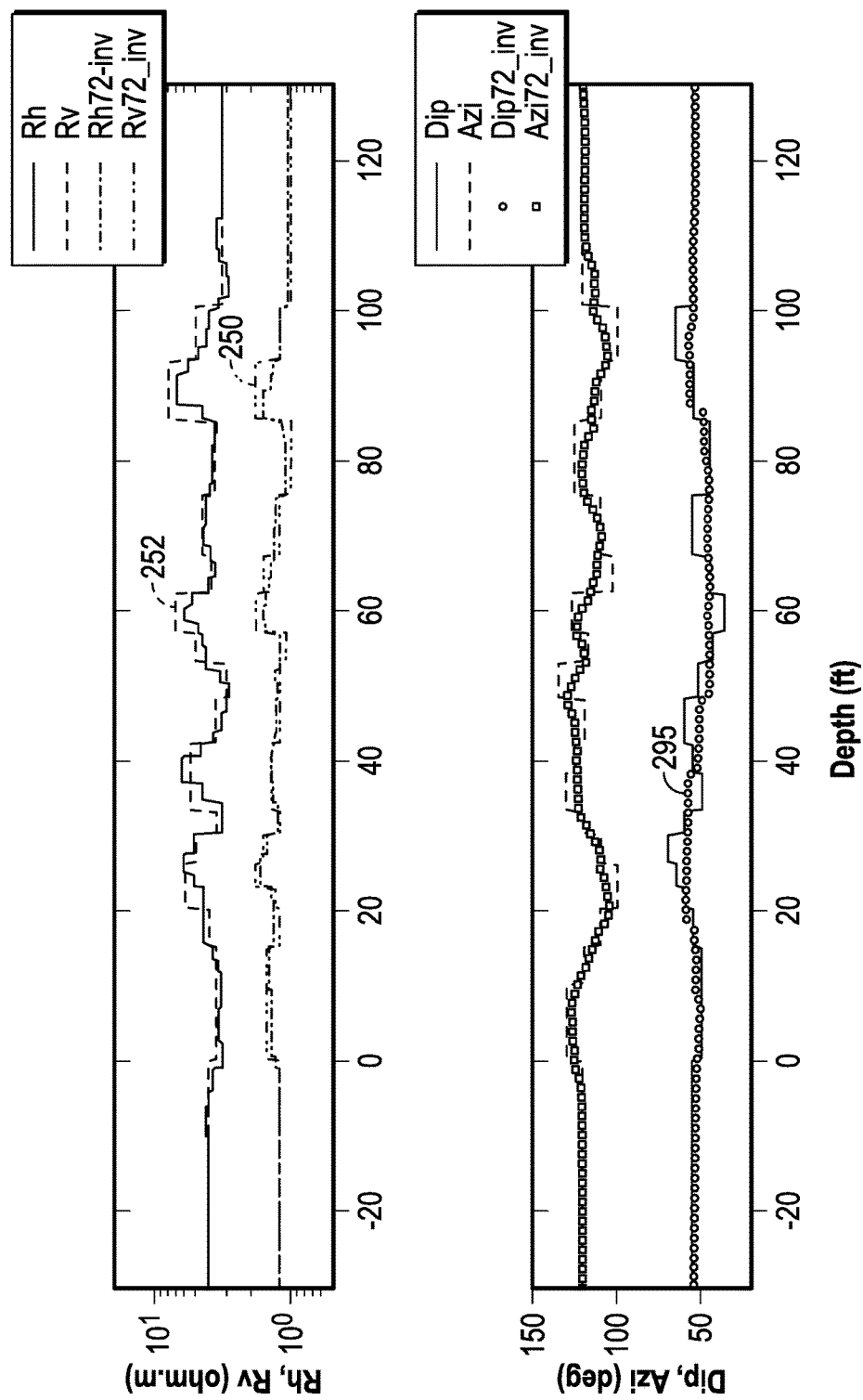
FIG. 10 shows an example of an extended 1D inversion where dip is not allowed to vary in the inversion zone in accordance with aspects of the present disclosure.

For the sake of comparison, we switched off the second pass of the extended 1D inversion process, and re-ran the inversion. The corresponding results are plotted in FIG. 10. The square logs for Rh and Rv and for dip and dip azimuth are the same as those in FIGS. 8 and 9. However, as can be seen, the inverted dip (circles 295) is found to be constant over every 10 feet zone in the illustrated depth range. This 10 feet extent corresponds to the size of the middle part of the 30 feet inversion zone. Normally only the results in the middle part of the inversion zone are kept and output to reduce the truncation effect. Thus, in comparison to the dip estimate with the regular extended 1D inversion of FIG. 9, the results in FIG. 10 show that when the second pass is omitted, the dip result is essentially a low pass filtered true dip in which the high frequency components are lost.

Figure 11:
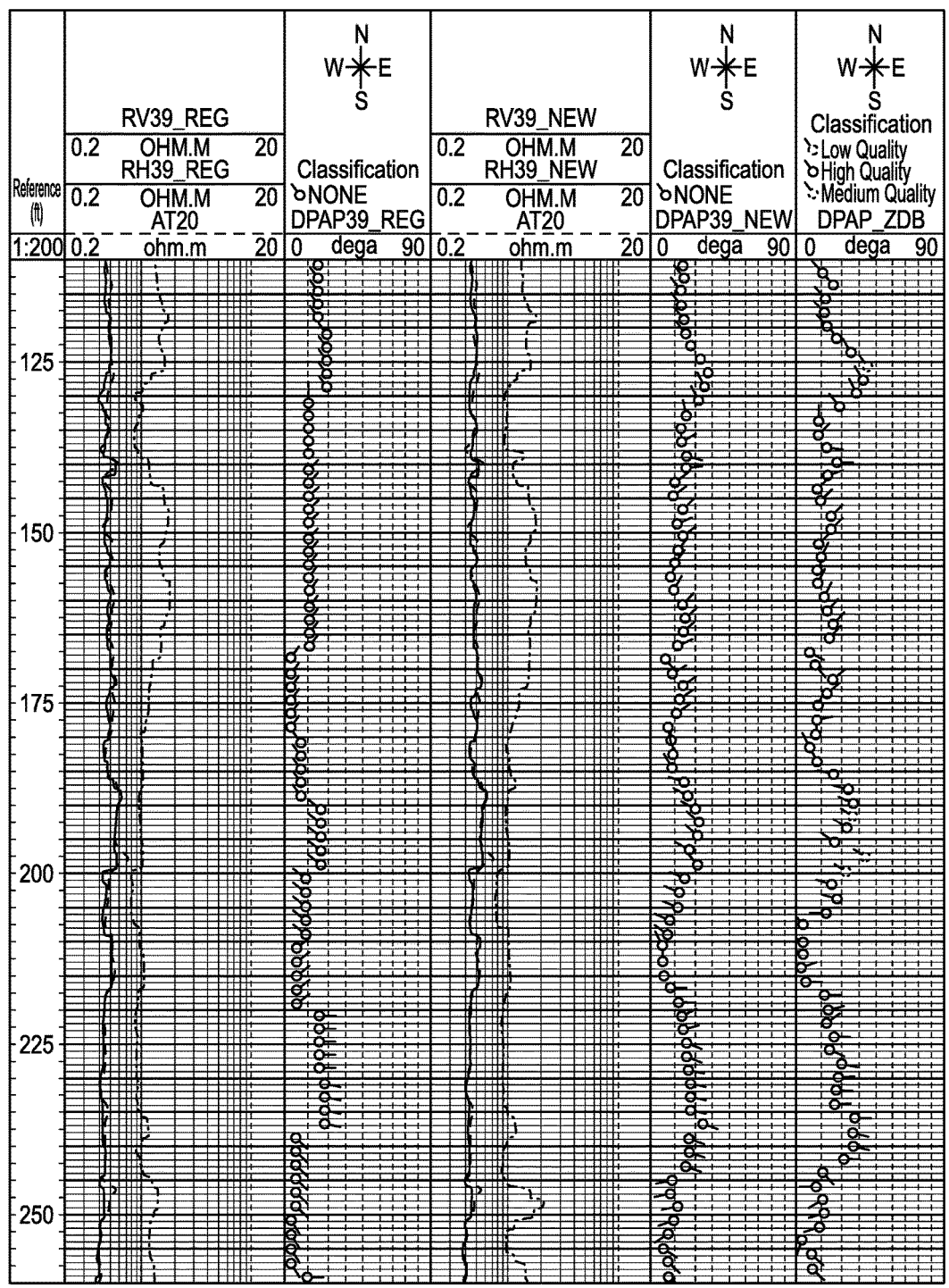
FIG. 11 are example logs from a water-base mud field example further illustrating an extended 1D inversion in accordance with aspects of the present disclosure.

FIG. 11 shows Rh, Rv, dip and dip azimuth obtained with the extended 1D inversion in a field WBM (water-base mud) case. Rh and Rv are shown in the first track, and dip and dip azimuth in the second track are obtained with a standard 1D inversion. Rh and Rv in the third track, and dip and dip azimuth in the fourth track are obtained with the extended 1D inversion. The dip and dip azimuth in the right-most track are obtained with a 0D inversion. Note that the horizontal resistivity mildly changes over the entire zone. This represents a favorable situation for a 0D inversion. The dip with the 0D inversion may serve as a good reference for the true formation dip. Indeed, it can be seen that Rh and Rv with the two 1D inversions are very similar. In contrast, the dip with the extended 1D inversion follows the 0D dip more closely than the standard 1D inversion.

In a further aspect, formation complexity may be determined using dip and/or dip azimuth obtained from the extended 1D inversion by finding the variation of dip and/or azimuth with respect to measured depth or true vertical depth. Further, as is well understood, instead of dip azimuth, strike (e.g., intersection between horizontal plane and bedding plane) may also be used to characterize formation orientation in conjunction with dip. The varying strike of a complex formation can be determined with the same techniques as that for dip azimuth as described in the present disclosure.

As will be understood, the various techniques described above and relating to extended 1D inversions are provided herein by way of example only. Accordingly, it should be understood that the present disclosure should not be construed as being limited to only the examples provided above. Further, it should be appreciated that the extended 1D inversion techniques disclosed herein may be implemented in any suitable manner, including hardware (suitably configured circuitry), software (e.g., via a computer program including executable code stored on one or more tangible computer readable medium), or via using a combination of both hardware and software elements.

While the specific embodiments described above have been shown by way of example, it will be appreciated that many modifications and other embodiments will come to the mind of one skilled in the art having the benefit of the teachings presented in the foregoing description and the associated drawings. Accordingly, it is understood that various modifications and embodiments are intended to be included within the scope of the appended claims.

What is claimed is:

1. A method to determine at least one formation property of a subterranean formation, comprising:
providing a downhole electromagnetic logging tool having at least one transmitter array and one receiver array;
acquiring measurements in the formation using the transmitter and receiver arrays of the downhole electromagnetic logging tool;
performing a first inversion in response to the measurements, wherein at least one of dip or dip azimuth are assumed constant in an inversion zone within the formation to obtain an inverted formation model that comprises at least one of horizontal resistivity (Rh), vertical resistivity (Rv), dip, and dip azimuth;
determining an n-th order partial derivative matrix of at least one of dip or dip azimuth, wherein n is greater than or equal to 1;
performing a second inversion using the determined n-th order partial derivative matrix, wherein at least one of dip and dip azimuth are allowed to vary in the inversion zone, to obtain an updated formation model; and
determining the at least one formation property of the formation using the updated formation model.

2. The method of claim 1, wherein n=1 and the partial derivative matrix comprises a Jacobian matrix of at least one of dip or dip azimuth.

3. The method of claim 1, wherein determining the n-th order partial derivative matrix comprises using a mathematical expansion.

4. The method of claim 3, wherein the mathematical expansion comprises using an approximated expansion that ignores contribution of at least one of dip or dip azimuth from beds in the inverted formation model other than a host bed in which a sensitivity center of the measurements is located.

5. The method of claim 3, wherein the mathematical expansion comprises using a complete expansion that takes into account contributions of at least one of dip or dip azimuth from each bed in the inverted formation model.

6. The method of claim 3, wherein the mathematical expansion comprises a Taylor series expansion.

7. The method of claim 5, wherein the mathematical expansion is performed according to:

$$\sigma_a(\alpha, \beta) \approx$$

$$\sigma_a(\alpha_0, \beta_0) + \sum_{i=1}^{N} \frac{\partial \sigma_a(\alpha_{i,0}, \beta_{i,0})}{\partial \alpha_i}(\alpha_i - \alpha_0) + \sum_{i=1}^{N} \frac{\partial \sigma_a(\alpha_{i,0}, \beta_{i,0})}{\partial \beta_i}(\beta_i - \beta_0)$$

wherein $\alpha_0 = (\alpha_{k,0})$, $\beta_0 = (\beta_{k,0})$, where $\alpha_{k,0} = \alpha_0$, and $\beta_{k,0} = \beta_0$, wherein $\alpha_0$ and $\beta_0$ represents the dip and dip azimuth, respectively, from the inverted formation model, and wherein the n-th order partial derivative matrix is determined as a first-order partial derivative matrix that includes first-order partial derivatives for dip and dip azimuth determined using:

$$\frac{\partial H_{n_T n_R}}{\partial \alpha_i} = I_m I(\sigma_{v,i} - \sigma_{h,i}) \int_{V_i} d\vec{r}' (E_{x,n_R} E_{z,n_T} + E_{x,n_T} E_{z,n_R})$$

-continued $$\frac{\partial H_{n_T n_R}}{\partial \beta_i} = I_m l(\sigma_{v,i} - \sigma_{h,i})\sin\theta \int_{V_i} d\vec{r}'(E_{y,n_R}E_{z,n_T} + E_{y,n_T}E_{z,n_R})$$

wherein $H_{n_R n_T}$ is a magnetic field at a receiver of the receiver array oriented in the nR direction in response to a transmitter of the transmitter array oriented in the nr direction, $I_m l$ is a dipole moment of a source corresponding to the transmitter, $E_{n_T} = (E_{x,n_T}, E_{y,n_T}, E_{z,n_T})^t$ is an electric field due to the source with a unit dipole moment corresponding to the transmitter, $E_{n_R} = (E_{x,n_R}, E_{y,n_R}, E_{z,n_R})^t$ is an electric field due to a source with a unit dipole moment corresponding to the receiver, $\sigma_{h,i}$ and $\sigma_{v,i}$ represent horizontal conductivity and vertical conductivity of bed i, respectively, $\theta$ is a bedding dip in accordance with a tool coordinate system, $V_i$ designates the support of bed i, and $\alpha_i$ and $\beta_i$ represent dip and dip azimuth, respectively of bed i.

8. The method of claim 1, comprising using at least one of dip or dip azimuth from the updated formation model to find variation in at least one of dip or azimuth with respect to measured depth or true vertical depth to determine complexity of the formation.

9. The method of claim 1, wherein n=2 and the partial derivative matrix comprises a Hessian matrix of at least one of dip or dip azimuth.

10. A system comprising:
an electromagnetic logging tool having at least one transmitter array and one receiver array, the electromagnetic logging tool being configured to acquire measurements in a subterranean formation using the transmitter and receiver arrays when disposed in the formation; a processing device configured to:
perform a first inversion in response to the measurements wherein at least one of dip or dip azimuth are assumed constant in an inversion zone within the formation to obtain an inverted formation model that comprises at least one of horizontal resistivity (Rh), vertical resistivity (Rv), dip, and dip azimuth;
determine an n-th order partial derivative matrix of at least one of dip or dip azimuth, wherein n is greater than or equal to 1;
perform a second inversion using the determined n-th order partial derivative matrix, wherein at least one of dip and dip azimuth are allowed to vary in the inversion zone, to obtain an updated formation model; and
determine at least one formation property of the formation using the updated formation model.

11. The system of claim 10, wherein the electromagnetic logging tool is conveyed using at least one of drill pipe, wireline, slickline, or coiled tubing.

12. The system of claim 10, wherein the electromagnetic logging tool comprises a wireline or an logging-while-drilling tool.

13. The system of claim 10, wherein n=1 and the partial derivative matrix comprises a Jacobian matrix of at least one of dip or dip azimuth.

14. The system of claim 10, wherein the processing device determines the n-th order partial derivative matrix comprises using a mathematical expansion.

15. The system of claim 14, wherein the mathematical expansion comprises using an approximated expansion that ignores contribution of at least one of dip or dip azimuth from beds in the inverted formation model other than a host bed in which a sensitivity center of the measurements is located.

16. The system of claim 14, wherein the mathematical expansion comprises using a complete expansion that takes into account contributions of at least one of dip or dip azimuth from each bed in the inverted formation model.

17. The system of claim 14, wherein the mathematical expansion comprises a Taylor series expansion.

18. A non-transitory computer-readable medium having computer executable instructions for causing a computer to:
in response to electromagnetic measurement obtained by an electromagnetic logging tool disposed in a formation, perform a first inversion wherein at least one of dip or dip azimuth are assumed constant in an inversion zone within the formation to obtain an inverted formation model that comprises at least one of horizontal resistivity (Rh), vertical resistivity (Rv), dip, and dip azimuth;
determine an n-th order partial derivative matrix of at least one of dip or dip azimuth, wherein n is greater than or equal to 1;
perform a second inversion using the determined n-th order partial derivative matrix, wherein at least one of dip and dip azimuth are allowed to vary in the inversion zone, to obtain an updated formation model; and
determine at least one formation property of the formation using the updated formation model.

19. The non-transitory computer-readable medium of claim 18, wherein the determination of the n-th order partial derivative matrix comprises using a mathematical expansion.

20. The non-transitory computer-readable medium of claim 19, wherein the mathematical expansion comprises using an approximated expansion that ignores contribution of at least one of dip or dip azimuth from beds in the inverted formation model other than a host bed in which a sensitivity center of the measurements is located.

21. The non-transitory computer-readable medium of claim 19, wherein the mathematical expansion comprises using a complete expansion that takes into account contributions of at least one of dip or dip azimuth from each bed in the inverted formation model.

* * * * *